United States Patent
Palacharla et al.

(10) Patent No.: US 12,461,860 B2
(45) Date of Patent: Nov. 4, 2025

(54) PHYSICAL ADDRESS BASED SET PARTITIONING

(71) Applicant: QUALCOMM Incorporated, San Diego, CA (US)

(72) Inventors: Subbarao Palacharla, San Diego, CA (US); Hiral Nandu, South San Francisco, CA (US); George Patsilaras, San Diego, CA (US); Simon Peter William Booth, San Diego, CA (US); Rakesh Kumar Gupta, San Diego, CA (US); Kedar Bhole, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

(21) Appl. No.: 18/522,049

(22) Filed: Nov. 28, 2023

(65) Prior Publication Data

US 2024/0370376 A1    Nov. 7, 2024

Related U.S. Application Data

(60) Provisional application No. 63/500,560, filed on May 5, 2023.

(51) Int. Cl.
*G06F 12/0888* (2016.01)
*G06F 12/0864* (2016.01)

(52) U.S. Cl.
CPC .... *G06F 12/0888* (2013.01); *G06F 2212/604* (2013.01)

(58) Field of Classification Search
CPC ........... G06F 12/0888; G06F 2212/604; G06F 12/0871; G06F 12/0802
(Continued)

(56) References Cited

U.S. PATENT DOCUMENTS

2009/0248984 A1* 10/2009 Shen ................... G06F 12/0884
                                                                  711/E12.024
2011/0167224 A1    7/2011 Isono
(Continued)

FOREIGN PATENT DOCUMENTS

EP          3066571 B1      6/2018

OTHER PUBLICATIONS

International Search Report and Written Opinion—PCT/US2024/021317—ISA/EPO—Jun. 19, 2024.

*Primary Examiner* — Arpan P. Savla
*Assistant Examiner* — Sidney Li
(74) *Attorney, Agent, or Firm* — Procopio, Cory, Hargreaves & Savitch LLP

(57) ABSTRACT

Aspects presented herein relate to methods and devices for data or graphics processing including an apparatus, e.g., a graphics processing unit (GPU). The apparatus may configure an address range in a cache. The apparatus may also obtain a request to access data in the cache, where the request to access the data includes an address in the cache that maps to a set index in a plurality of set indexes, where an address value for the set index corresponds to a portion of the address. Further, the apparatus may select an updated address value for the set index, where the updated address value is associated with an updated address within the address range, and the updated address value corresponds to a portion of the updated address. The apparatus may also allocate the data in the request to the updated address value for the set index.

29 Claims, 13 Drawing Sheets

(58) Field of Classification Search
USPC .......................................................... 711/129
See application file for complete search history.

(56) References Cited

U.S. PATENT DOCUMENTS

2017/0109289 A1\* 4/2017 Gonzalez Gonzalez ....................
G06F 12/0833
2022/0309002 A1 9/2022 Yang \* cited by examiner

PHYSICAL ADDRESS BASED SET PARTITIONING

CROSS REFERENCE TO RELATED APPLICATION(S)

This application claims the benefit of and priority to U.S. Provisional Application Ser. No. 63/500,560, entitled "PHYSICAL ADDRESS BASED SET PARTITIONING" and filed on May 5, 2023, which is expressly incorporated by reference herein in its entirety.

TECHNICAL FIELD

The present disclosure relates generally to processing systems and, more particularly, to one or more techniques for data processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a central processing unit (CPU), or any apparatus that may perform for data processing or graphics processing. The apparatus may configure an address range in a cache, where the address range is associated with data allocations for the cache. The apparatus may also obtain a request to access data in the cache, where the request to access the data includes an address in the cache that maps to a set index in a plurality of set indexes, where an address value for the set index corresponds to a portion of the address in the cache. Additionally, the apparatus may select, based on the address value of the set index, an updated address value for the set index, where the updated address value is associated with an updated address within the address range in the cache, and where the updated address value corresponds to a portion of the updated address in the cache. The apparatus may also identify at least one of a way address or a tag address in the cache for the data in the request based on the selection of the updated address value for the set index, where the way address and the tag address in the cache correspond to the portion of the updated address in the cache. Moreover, the apparatus may determine that the data in the request is located in the cache (e.g., determine that there is a cache hit), where an allocation of the data in the request to the updated address value for the set index is based on the determination that the data is located in the cache. The apparatus may also allocate the data in the request to the updated address value for the set index. The apparatus may also output an indication of the allocation of the data in the request to the updated address value for the set index.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
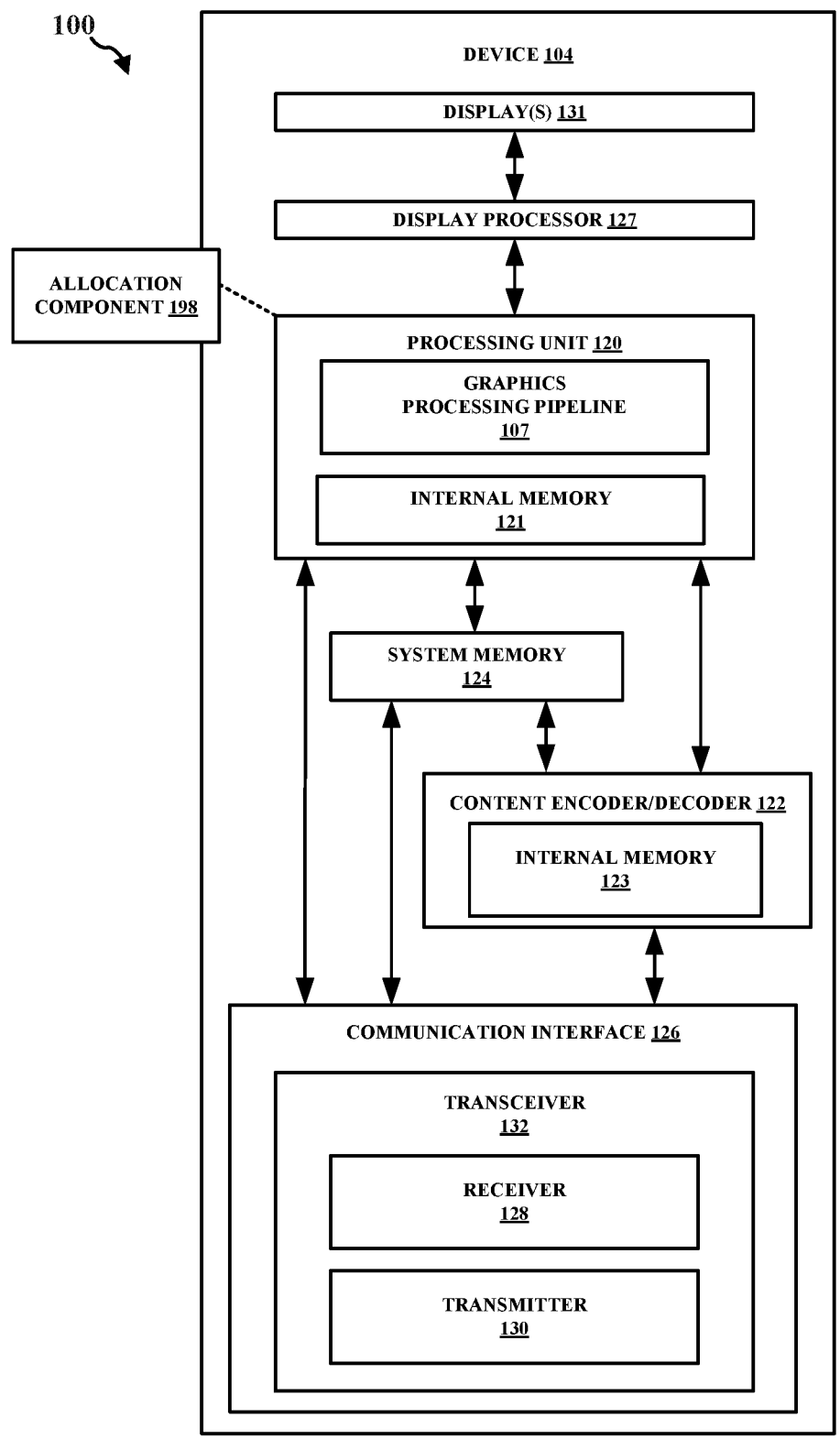
FIG. 1 is a block diagram that illustrates an example content generation system.

The associativity for caches may be limited for a number of reasons. For example, the associativity for caches may be limited for timing reasons and/or power reasons. This may lead to partitioning challenges for certain types of caches, such as jumbo caches (e.g., caches with a capacity of 32 MB or larger). Certain types of buffers (e.g., image buffer) may be smaller than a cache way. For example, depth map buffers (e.g., buffers with a capacity of 64 kB) may be much smaller than a cache way (e.g., size of 1 MB). As such, while the image buffer is using a cache with more than 1-way of associativity, it may be susceptible to cache conflicts similar to a direct mapped cache. Accordingly, when utilizing small buffers (e.g., depth map buffers), there may be a high rate of cache conflicts. Aspects of the present disclosure may reduce or eliminate the rate of cache conflicts. In order to reduce or eliminate the rate of cache conflicts, aspects presented herein may utilize small buffers in order to conserve cache space. Aspects presented herein may do so by utilizing set partitioning (e.g., physical address (PA)-based set partitioning). For instance, aspects presented herein may partition or perform set partitioning based on a physical address. Physical address (PA)-based set partitioning may provide aspects presented herein with a way to conserve cache space without being limited by associativity. For example, aspects presented herein (via PA-based set partitioning) may embed multiple set-associative caches without being limited by associativity. Aspects presented herein may make a single cache way to be associative by mapping different addresses to different sets.

Aspects presented herein may include a number of benefits or advantages. For instance, aspects presented herein may efficiently cache small buffers in a system cache. For example, aspects presented herein may be utilized (e.g., in system-on-chips (SoCs)) in order to efficiently cache small buffers in a system cache. That is, aspects presented herein may be utilized (e.g., in SoCs) in order to allocate small buffers efficiently without wasting cache space. Additionally, aspects of the present disclosure may reduce or eliminate the rate of cache conflicts. In order to reduce or eliminate the rate of cache conflicts, aspects presented herein may utilize small buffers in order to conserve cache space. Aspects presented herein may do so by utilizing set partitioning (e.g., physical address (PA)-based set partitioning). For instance, aspects presented herein may partition or perform set partitioning based on a physical address. PA-based set partitioning may provide aspects presented herein with a way to conserve cache space without being limited by associativity. For example, aspects presented herein (via PA-based set partitioning) may embed multiple set-associative caches without being limited by associativity.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include an allocation component 198 configured to configure an address range in a cache, where the address range is associated with data allocations for the cache. The allocation component 198 may also be configured to obtain a request to access data in the cache, where the request to access the data includes an address in the cache that maps to a set index in a plurality of set indexes, where an address value for the set index corresponds to a portion of the address in the cache. The allocation component 198 may also be configured to select, based on the address value of the set index, an updated address value for the set index, where the updated address value is associated with an updated address within the address range in the cache, and where the updated address value corresponds to a portion of the updated address in the cache. The allocation component 198 may also be configured to identify at least one of a way address or a tag address in the cache for the data in the request based on the selection of the updated address value for the set index, where the way address and the tag address in the cache correspond to the portion of the updated address in the cache. The allocation component 198 may also be configured to determine that the data in the request is located in the cache (e.g., determine that there is a cache hit), where an allocation of the data in the request to the updated address value for the set index is based on the determination that the data is located in the cache. The allocation component 198 may also be configured to allocate the data in the request to the updated address value for the set index. The allocation component 198 may also be configured to output an indication of the allocation of the data in the request to the updated address value for the set index. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
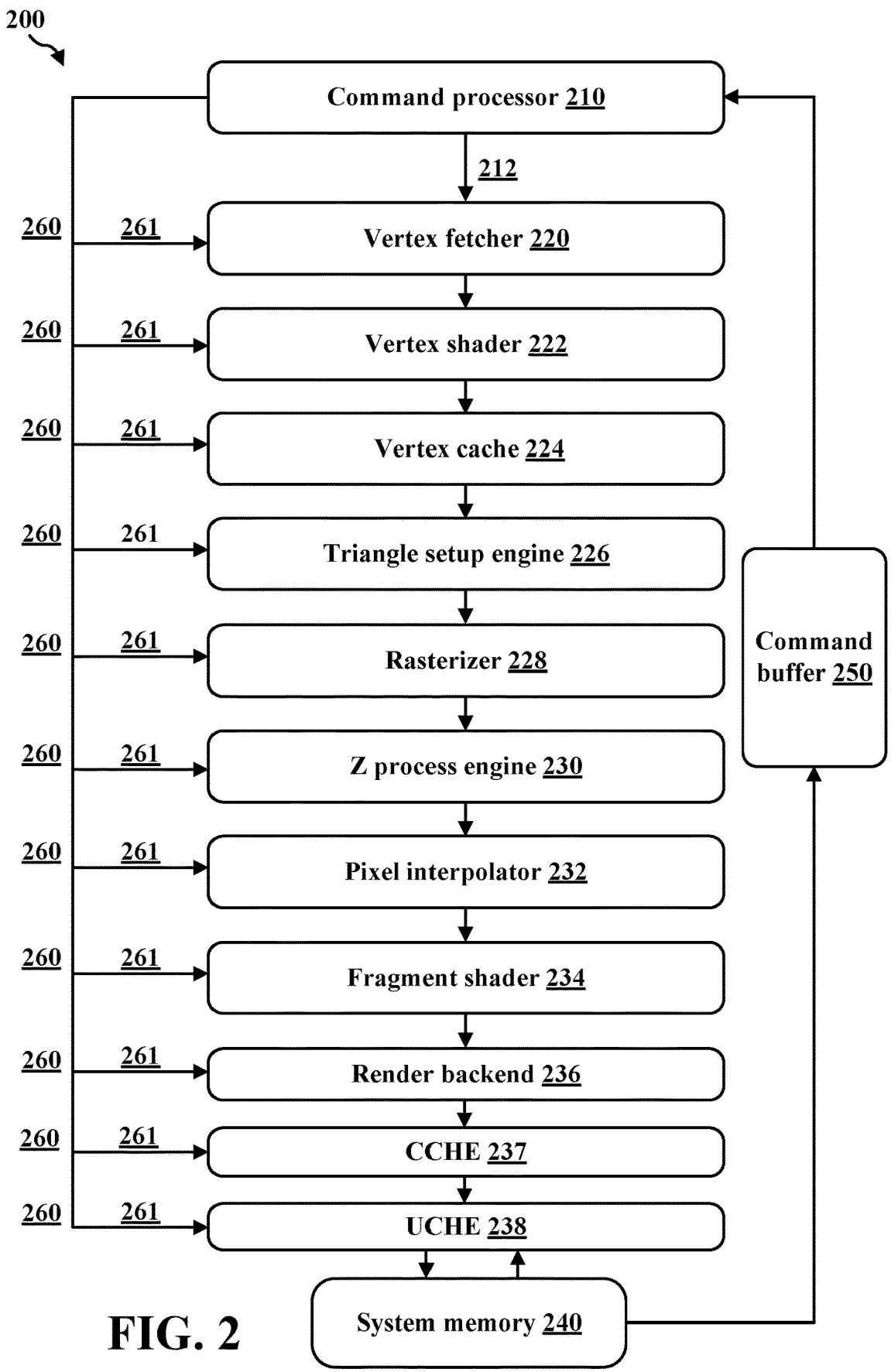
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 1 (L1) cache (cluster cache (CCHE)) 237, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some types of GPUs may include different types of pipelines, such as a graphics processing pipeline. Graphics processing pipelines may include one or more of a vertex shader stage, a hull shader stage, a domain shader stage, a geometry shader stage, and a pixel shader stage. These stages of the graphics processing pipeline may be considered shader stages. These shader stages may be implemented as one or more shader programs that execute on shader units at a GPU. Shader units may be configured as a programmable pipeline of processing components. In some examples, a shader unit may be referred to as "shader processors" or "unified shaders," and may perform geometry, vertex, pixel, or other shading operations to render graphics. Shader units may include shader processors, each of which may include one or more components for fetching and decoding operations, one or more arithmetic logic units (ALUs) for carrying out arithmetic calculations, one or more memories, caches, and registers.

Figure 3:
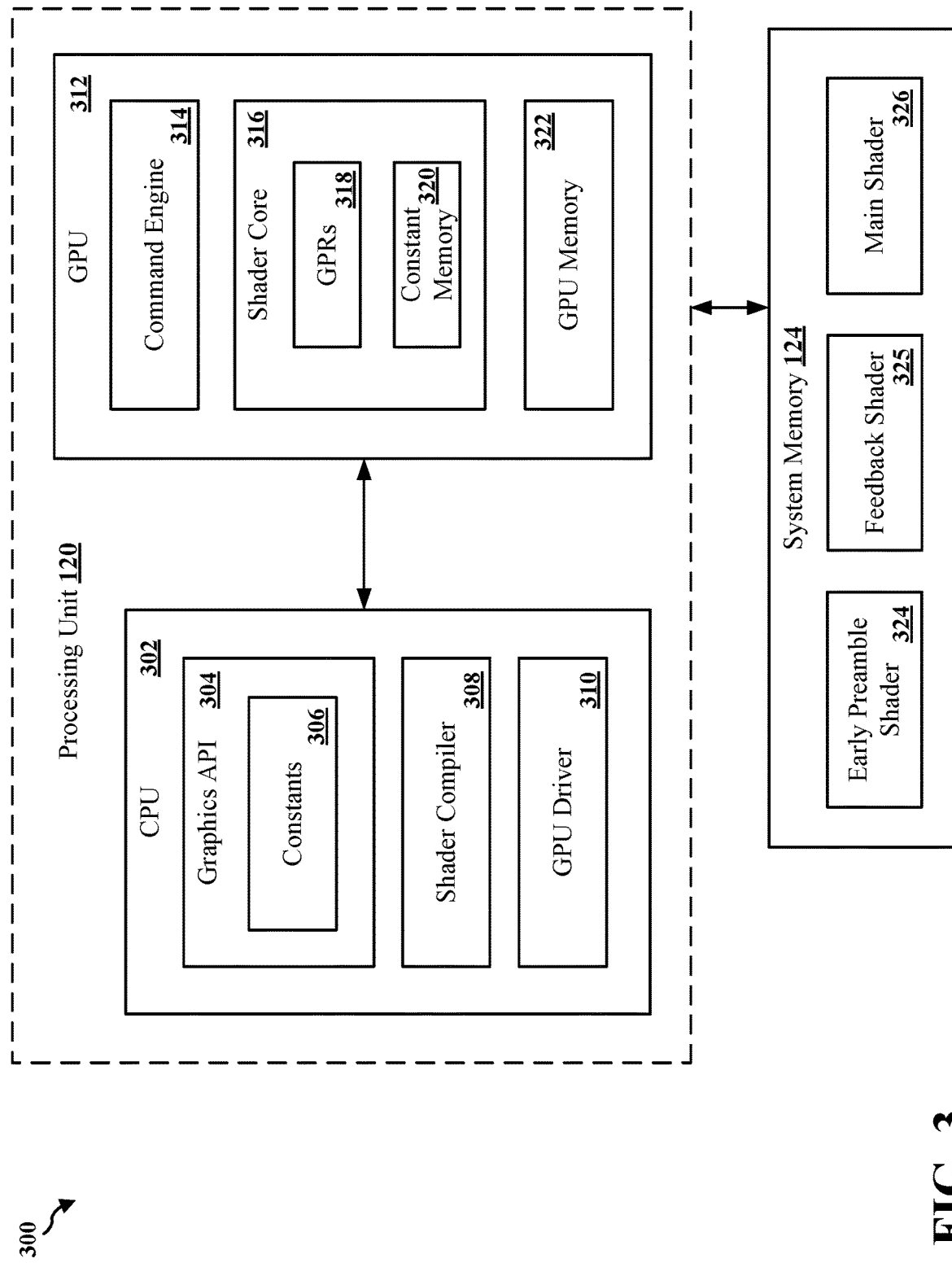
FIG. 3 is a diagram illustrating example processing components.

FIG. 3 is a diagram 300 that illustrates processing components, such as the processing unit 120 and the system memory 124, as may be identified in connection with the device 104 for processing data. In aspects, the processing unit 120 may include a CPU 302 and a GPU 312. The GPU 312 and the CPU 302 may be formed as an integrated circuit (e.g., a system-on-a-chip (SOC)) and/or the GPU 312 may be incorporated onto a motherboard with the CPU 302. Alternatively, the CPU 302 and the GPU 312 may be configured as distinct processing units that are communicatively coupled to each other. For example, the GPU 312 may be incorporated on a graphics card that is installed in a port of the motherboard that includes the CPU 302.

The CPU 302 may be configured to execute a software application that causes graphical content to be displayed (e.g., on the display(s) 131 of the device 104) based on one or more operations of the GPU 312. The software application may issue instructions to a graphics application program interface (API) 304, which may be a runtime program that translates instructions received from the software application into a format that is readable by a GPU driver 310. After receiving instructions from the software application via the graphics API 304, the GPU driver 310 may control an operation of the GPU 312 based on the instructions. For example, the GPU driver 310 may generate one or more command streams that are placed into the system memory 124, where the GPU 312 is instructed to execute the command streams (e.g., via one or more system calls). A command engine 314 included in the GPU 312 is configured to retrieve the one or more commands stored in the command streams. The command engine 314 may provide commands from the command stream for execution by the GPU 312. The command engine 314 may be hardware of the GPU 312, software/firmware executing on the GPU 312, or a combination thereof. While the GPU driver 310 is configured to implement the graphics API 304, the GPU driver 310 is not limited to being configured in accordance with any particular API. The system memory 124 may store the code for the GPU driver 310, which the CPU 302 may retrieve for execution. In examples, the GPU driver 310 may be configured to allow communication between the CPU 302 and the GPU 312, such as when the CPU 302 offloads graphics or non-graphics processing tasks to the GPU 312 via the GPU driver 310.

The system memory 124 may further store source code for one or more of an early preamble shader 324, a feedback shader 325, or a main shader 326. In such configurations, a shader compiler 308 executing on the CPU 302 may compile the source code of the shaders 324-326 to create object code or intermediate code executable by a shader core 316 of the GPU 312 during runtime (e.g., at the time when the shaders 324-326 are to be executed on the shader core 316). In some examples, the shader compiler 308 may pre-compile the shaders 324-326 and store the object code or intermediate code of the shader programs in the system memory 124. The shader compiler 308 (or in another example the GPU driver 310) executing on the CPU 302 may build a shader program with multiple components including the early preamble shader 324, the feedback shader 325, and the main shader 326. The main shader 326 may correspond to a portion or the entirety of the shader program that does not include the early preamble shader 324 or the feedback shader 325. The shader compiler 308 may receive instructions to compile the shader(s) 324-326 from a program executing on the CPU 302. The shader compiler 308 may also identify constant load instructions and common operations in the shader program for including the common operations within the early preamble shader 324 (rather than the main shader 326). The shader compiler 308 may identify such common instructions, for example, based on (presently undetermined) constants 306 to be included in the common instructions. The constants 306 may be defined within the graphics API 304 to be constant across an entire draw call. The shader compiler 308 may utilize instructions such as a preamble shader start to indicate a beginning of the early preamble shader 324 and a preamble shader end to indicate an end of the early preamble shader 324. Similar instructions may be used for the feedback shader 325 and the main shader 326. The feedback shader 325 will be described in further detail below.

The shader core 316 included in the GPU 312 may include general purpose registers (GPRs) 318 and constant memory 320. The GPRs 318 may correspond to a single GPR, a GPR file, and/or a GPR bank. Each GPR in the GPRs 318 may store data accessible to a single thread. The software and/or firmware executing on GPU 312 may be a shader program 324-326, which may execute on the shader core 316 of GPU 312. The shader core 316 may be configured to execute many instances of the same instructions of the same shader program in parallel. For example, the shader core 316 may execute the main shader 326 for each pixel that defines a given shape. The shader core 316 may transmit and receive data from applications executing on the CPU 302. In examples, constants 306 used for execution of the shaders 324-326 may be stored in a constant memory 320 (e.g., a read/write constant RAM) or the GPRs 318. The shader core 316 may load the constants 306 into the constant memory 320. In further examples, execution of the early preamble shader 324 or the feedback shader 325 may cause a constant value or a set of constant values to be stored in on-chip memory such as the constant memory 320 (e.g., constant RAM), the GPU memory 322, or the system memory 124. The constant memory 320 may include memory accessible by all aspects of the shader core 316 rather than just a particular portion reserved for a particular thread such as values held in the GPRs 318.

Figure 4:
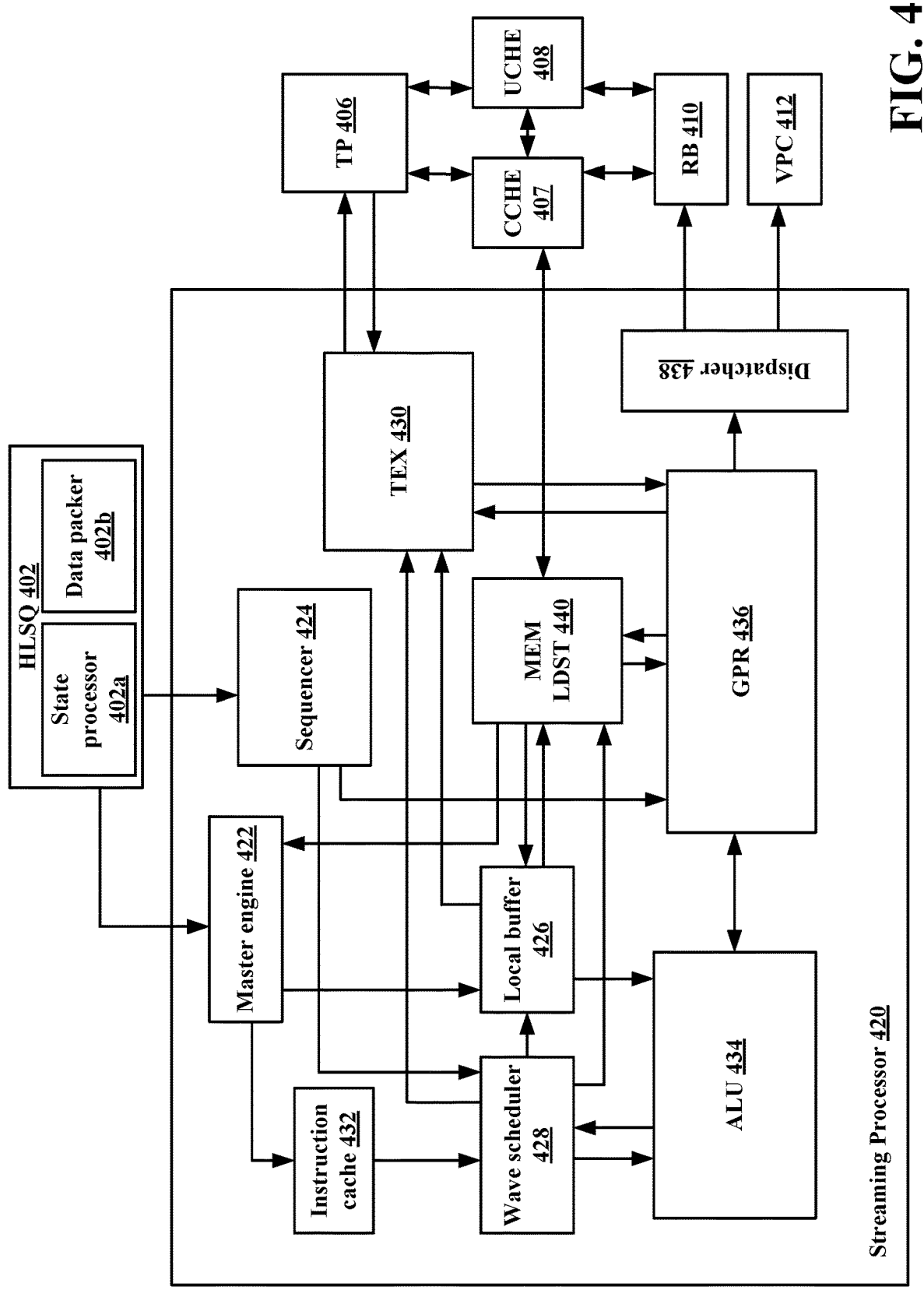
FIG. 4 is a diagram illustrating an example GPU.

FIG. 4 illustrates an example GPU 400. Specifically, FIG. 4 illustrates a streaming processor (SP) system in GPU 400. As shown in FIG. 4, GPU 400 includes a high level sequencer (HLSQ) 402, texture processor (TP) 406, level 1 (L1) cache (cluster cache (CCHE)) 407, level 2 (L2) cache (UCHE) 408, render backend (RB) 410, and vertex cache (VPC) 412. GPU 400 also includes SP 420, master engine 422, sequencer 424, local buffer 426, wave scheduler 428, texture (TEX) 430, instruction cache 432, arithmetic logic unit (ALU) 434, GPR 436, dispatcher 438, and memory (MEM) load store (LDST) 440.

As shown in FIG. 4, each unit or block in GPU 400 may send data or information to other blocks. For instance, HLSQ 402 may send commands to the master engine 422. Also, HLSQ 402 may send vertex threads, vertex attributes, pixel threads, pixel attributes, and/or compute commands to the sequencer 424. TP 406 may receive texture requests from TEX 430, and send texture elements (texels) back to the TEX 430. Further, TP 406 may send memory read requests to and receive memory data from CCHE 407 or UCHE 408. CCHE 407 or UCHE 408 may also receive memory read or write requests from MEM LDST 440 and send memory data back to MEM LDST 440, as well as receive memory read or write requests from RB 410 and send memory data back to RB 410. Also, RB 410 may receive an output in the form of color from GPR 436, e.g., via dispatcher 438. VPC 412 may also receive output in the form of vertices from GPR 436, e.g., via dispatcher 438. GPR 436 may send address data or receive write back data from MEM LDST 440. GPR 436 may also send temporary data to and receive temporary data from ALU 434. Moreover, ALU 434 may send address or predicate information to the wave scheduler 428, as well as receive instructions from wave scheduler 428. Local buffer 426 may send constant data to ALU 434. TEX 430 may also receive texture attributes from or send texture data to GPR 436, as well as receive constant data from local buffer 426. Further, TEX 430 may receive texture requests from wave scheduler 428, as well as receive constant data from local buffer 426. MEM LDST 440 may send/receive constant data to/from local buffer 426. Sequencer 424 may send wave data to wave scheduler 428, as well as send data to GPR 436. The sequencer 424 may allocate resources and local memory. Also, the sequencer 424 may allocate wave slots and any associated GPR 436 space. For example, the sequencer 424 may allocate wave slots or GPR 436 space when the HLSQ 402 issues a pixel tile workload to the SP 420. Master engine 422 may send program data to instruction cache 432, as well as send constant data to local buffer 426 and receive instructions from MEM LDST 440. Instruction cache 432 may send instructions or decode information to wave scheduler 428. Wave scheduler 428 may send read requests to local buffer 426, as well as send memory requests to MEM LDST 440.

As further shown in FIG. 4, the HLSQ 402 may prepare one or more context states for the SP 420. For example, the HLSQ 402 may prepare the context states for different types of data, e.g., global register data, shader constant data, buffer descriptors, instructions, etc. Additionally, the HLSQ 402 may embed context states into a command stream to the SP 420. The master engine 422 may parse the command stream from the HLSQ 402 and setup an SP global state. Moreover, the master engine 422 may fill or add to an instruction cache 432 and/or a local buffer 426 or a constant buffer. In some aspects, inside the HLSQ 402, there may be an internal function unit called a state processor 402a. The state processor 402a may be a single fiber scalar processor that may execute a special shader program, e.g., a preamble shader. The preamble shader may be generated by the GPU compiler in order to load constant data from different buffer objects. Also, the preamble shader may bind the buffer objects into a single constant buffer, such as a post-process constant buffer. Further, the HLSQ 402 may execute the preamble shader and, as a result, skip utilizing a main shader. In some instances, the main shader may perform different shading tasks, such as normal vertex shading and/or a fragment shading program. Moreover, the HLSQ 402 may include a data packer 402b.

Additionally, as shown in FIG. 4, the SP 420 may not be limited to executing a preamble if the HLSQ 402 decides to skip a preamble execution. For instance, the SP 420 may also process a conventional graphics workload, such as vertex shading and/or fragment shading. In some aspects, the SP 420 may utilize its execution units and storage in order to process compute tasks as a general purpose GPU (GPGPU). Inside the SP 420, there may be multiple parallel instruction execution units such as an ALU, elementary function unit (EFU), branching unit, TEX, general memory read and write (aka LDST), etc. The SP 420 may also include on-chip storage memory, such as a GPR 436 which may store per-fiber private data. Also, the SP 420 may include a local buffer 426 which stores per-shader or per-kernel constant data, per-wave uniform data (aka uGPR), and per-compute work group (WG) local memory (LM). Processing a preamble shader may take up one wave slot. Further, the majority of preamble shaders may use just the uGPR and not the GPR, and may execute ALU instructions on a scalar ALU. Therefore, execution of the preamble shader may be associated with high performance, and may be power efficient because any available wave slot may be used to execute the preamble shader even without GPR space allocation.

Moreover, as shown in FIG. 4, dispatcher 438 may fetch data from GPR 436. Dispatcher 438 may also perform format conversion, and then dispatch a final color to multiple render targets (RTs). Each RT may have one or more components, such as red (r) green (G) blue (B) alpha (A) (RGBA) data, or just an alpha component of the RGBA data. Further, each RT may be generally stored in a vector GPR, i.e., R3.0 may store red data, R3.1 may store green data, R3.2 may store blue data, etc. Also, a driver program in an SP context register may be utilized to define the GPR identifier (ID) which stores RT data.

Figure 5:
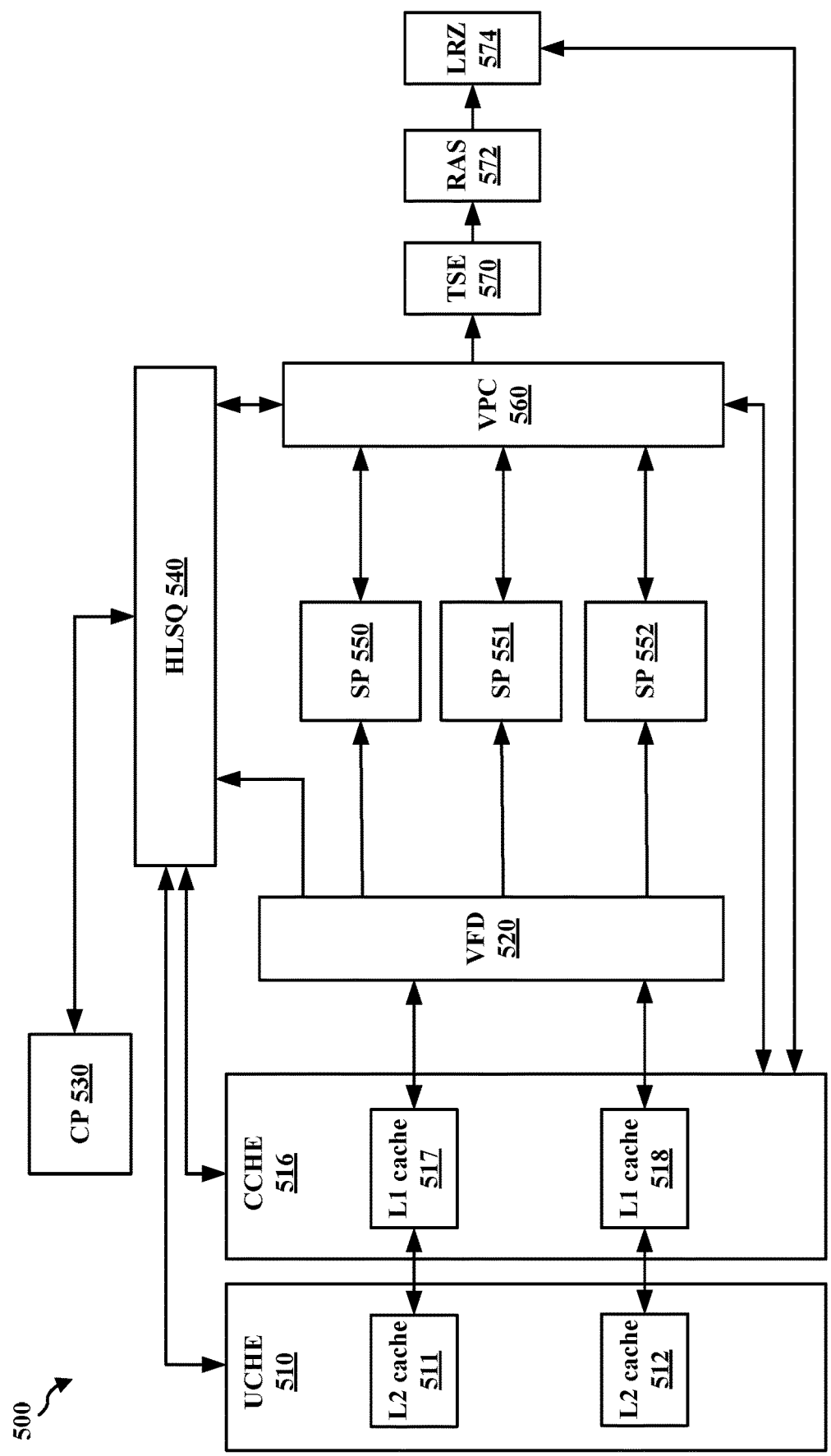
FIG. 5 is a diagram illustrating an example GPU.

FIG. 5 is a diagram illustrating another example GPU. More specifically, FIG. 5 depicts GPU 500 including a number of different components. As shown in FIG. 5, GPU 500 includes UCHE 510 including L2 cache 511 and L2 cache 512, CCHE 516 including L1 cache 517 and L1 cache 518, VFD 520, CP 530, HLSQ 540, a number of SPs (e.g., SP 550, SP 551, and SP 552), VPC 560, TSE 570, RAS 572, and low resolution Z (LRZ) component (e.g., LRZ 574). As shown in FIG. 5, CP 530 may transmit data to HLSQ 540 and receive data from HLSQ 540. CCHE 516 may transmit/receive data to/from HLSQ 540. UCHE 510 may also transmit/receive data to/from HLSQ 540. L2 cache 511 and L2 cache 512 may transmit/receive data to/from VFD 520. Further, VFD 520 may transmit data to HLSQ 540, as well as transmit data to SPs 550-552. Moreover, SPs 550-552 may transmit/receive data to/from VPC 560. Also, VPC 560 may transmit/receive data to/from HLSQ 540. Data can also be transmitted from VPC 560 to TSE 570, which can transmit data to RAS 572, and then to LRZ 574. CCHE 516 can transmit/receive data to/from VPC 560 and LRZ 574. Also, UCHE 510 can transmit/receive data to/from VPC 560 and LRZ 574.

As depicted in FIG. 5, GPUs (e.g., GPU 500) may include a number of different caches. GPUs utilize caches for a variety of reasons, such as to transfer data at a sufficiently high rate of speed. That is, as processing power for GPUs has increased at a higher rate than memory access speed, storage resources (e.g., caches) between the processor and memory have been utilized to transfer data at a sufficient rate. Caches at GPUs are also utilized to more seamlessly transfer data. One benefit of caches is that they provide buffering, so caches and buffers may be similar. For instance, caches may decrease latency by reading data from memory in larger chunks based on subsequent data accessing nearby address locations. Also, caches may increase throughput by assembling multiple small transfers into larger, more efficient memory requests. These benefits may be achieved by a cache storing data in blocks called cache lines. A cache line may be a portion of data that can be mapped into a cache. For example, a cache line may be a smallest portion of data that can be mapped into a cache.

In some aspects, each mapped cache line may be associated with a block (e.g., a core line), which is a corresponding region on a main memory or a backend storage). A backend storage may allow performance for the cache and GPU to improve. For example, database caching may allow an increased throughput and a reduced data retrieval latency associated with backend databases, which may improve the overall performance of the cache and GPU. Also, in some aspects, both the cache and main memory/backend storage may be divided into blocks of the size of a cache line. Further, all the cache mappings may be aligned to these blocks. Cache lines may have a certain size (e.g., between 32 to 512 bytes), and memory transactions may be performed in units of cache lines. Individual cache accesses made by code that executes on a GPU processor may be smaller than these units of cache lines (e.g., 4 bytes).

Figure 6:
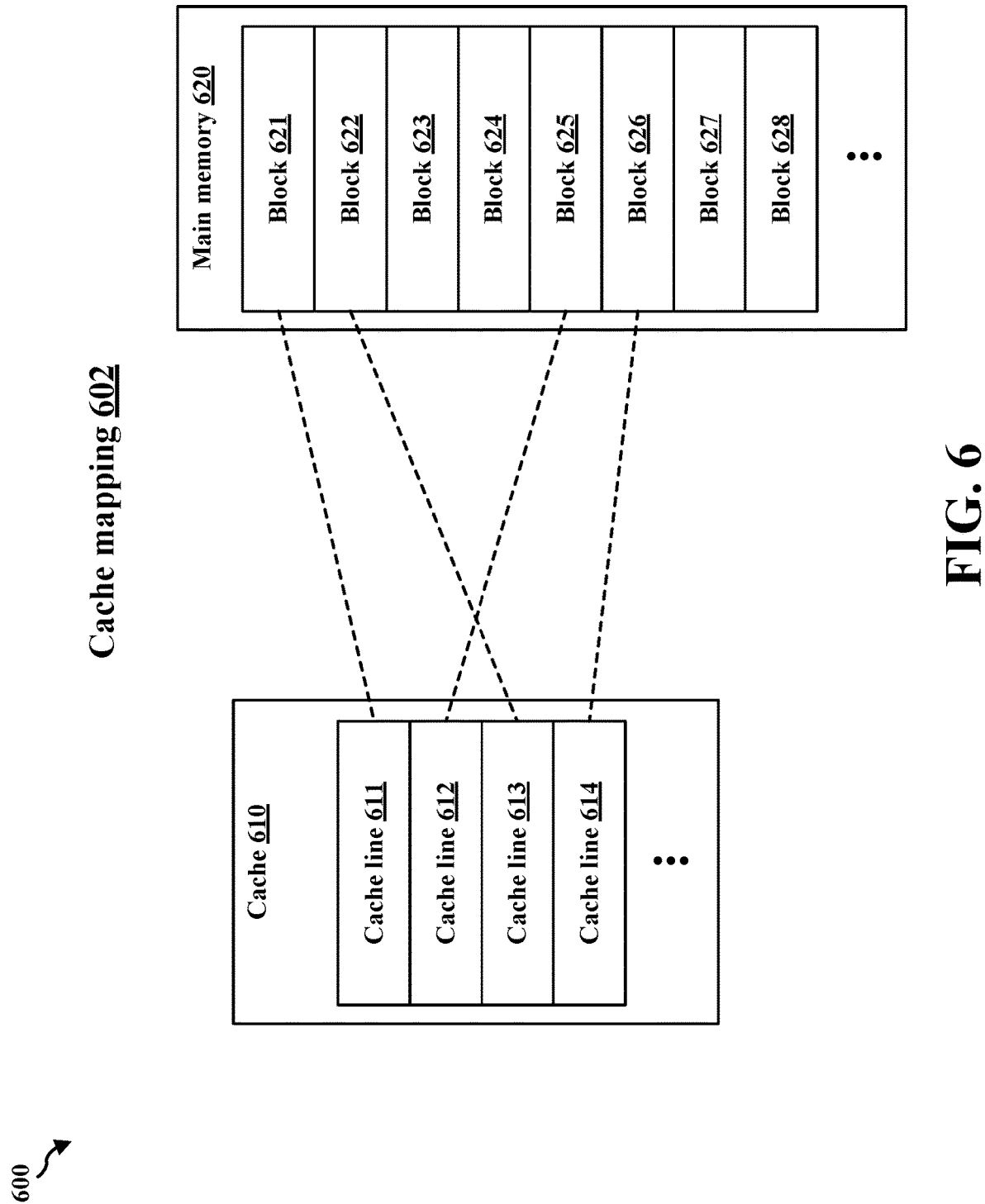
FIG. 6 is a diagram illustrating an example mapping of a cache.

FIG. 6 is a diagram 600 illustrating an example mapping of a cache. More specifically, FIG. 6 depicts a cache mapping 602 for a cache 610 and a main memory 620. That is, FIG. 6 depicts the relationship between cache lines in cache 610 (e.g., cache line 611, cache line 612, cache line 613, and cache line 614) and blocks in main memory 620 (e.g., block 621, block 622, block 623, block 624, block 625, block 626, block 627, and block 628). As shown in FIG. 6, diagram 600 illustrates that individual blocks 621-628 may be directly mapped to individual cache lines 611-614. For example, as illustrated in diagram 600, block 621 may be mapped to cache line 611, block 622 may be mapped to cache line 613, block 625 may be mapped to cache line 612, and block 626 may be mapped to cache line 614. Some of the blocks 621-628 may not be directly mapped to cache lines 611-614. For instance, block 623, block 624, block 627, and block 628 may not be directly mapped to cache lines 611-614. In some aspects, main memory 620 including blocks 621-628 may be a backend storage including a number of core lines.

In some caches, valid data (e.g., valid bits) and dirty data (e.g., dirty bits) may correspond to a current cache line state. For instance, when a cache line is valid (i.e., in a valid state) it may refer to the cache line being mapped to a block in main memory (e.g., a core line determined by a core identifier (ID) and a core line number). When a cache line is invalid (i.e., in an invalid state), it may be used to map a core line accessed by a certain request (e.g., an input/output (I/O) request), and the cache line may become valid thereafter. A cache line may return to an invalid state based on a number of different reasons. For example, a cache line may return to an invalid state: if the cache line is being evicted, if the core pointed to by the core ID is being removed, if the core pointed to by the core ID is being purged, if the entire cache is being purged, during a discard operation being performed on a corresponding core line, or during a certain request (e.g., an I/O request) when a cache mode which may perform an invalidation is selected.

In some aspects, dirty data or modified data may refer to data that is associated with a block of memory and indicates whether the corresponding block of memory has been modified. For example, a dirty bit or modified bit may be a bit that is associated with a block of memory and indicates whether the corresponding block of memory has been modified. The dirty data (e.g., dirty bit) may be set when a processor writes to (i.e., modifies) this memory. For instance, the dirty data (e.g., dirty bit) may indicate that its associated block of memory has been modified and has not been saved to storage yet. That is, "dirty data" may refer to data in a cache that is modified, but the memory still has an old or stale copy of the data. In some instances, when a block of memory is to be replaced, its corresponding dirty data (e.g., dirty bit) may be checked to determine if the block may need to be written back to secondary memory before being replaced or if it can simply be removed. Moreover, dirty data (e.g., dirty bit) may determine if the cache line data stored in the cache is in synchronization with corresponding data on the backend storage. For instance, if a cache line is dirty, then data on the cache storage may be up to date, and the data may need to be flushed (i.e., removed) at some point in the future (e.g., after the flushing the data may be marked as clean by zeroing a dirty bit). Also, a cache line may be considered valid if at least one of its sectors is valid. Likewise, a cache line may be considered dirty if at least one of its sectors is dirty.

In some instances, a goal of caches (e.g., caches in GPUs or CPUs) may be to increase the performance of repeated accesses to the same data, as caches may keep a copy of a subset of the data in memory. Accordingly, subsequent accesses of the data already in the cache may not utilize an expensive memory access transaction. As some caches may have a smaller capacity than the memory size (e.g., a memory size of a GPU system), the currently-cached data set may continuously change. This continuously change in cached data may be due to the memory access pattern of the executed code and/or the data replacement policy of the cache. In some aspects, one goal of caches may be to maximize the cache hit rate (i.e., the percentage of data accesses that can be served from data in the cache). By maximizing the cache hit rate, the overall performance of the cache (e.g., cache at a GPU or CPU) may be increased. This performance improvement may be important for overall systems that include the cache (e.g., GPUs or CPUs), as the systems may serve numerous simultaneously running threads with data.

Caches may receive a number of requests (e.g., data or content requests) to store or cache data. A cache hit may refer to an event when data requested for processing (e.g., requested by a component or application) is successfully retrieved from the cache memory. For example, a cache hit may describe when data or content is successfully found in the cache. That is, a cache hit may be when a system or application makes a request to retrieve data from a cache, and the specific data is currently in cache memory. A cache miss may refer to an event when data requested for processing (e.g., requested by a component or application) is not successfully retrieved from the cache memory. For example, a cache miss may describe when data or content is not successfully found in the cache. That is, a cache miss may be when a system or application makes a request to retrieve data from a cache, but that specific data is not currently in cache memory. Caches may be measured based on an amount of data requests that the cache is able to successfully fill. A cache hit rate (i.e., hit rate or cache hit ratio) is a measurement of how many data requests a cache is able to successfully fill compared to a total number of data requests it receives. For instance, a cache hit rate (i.e., hit rate or cache hit ratio) is equal to the number of cache hits divided by the total number of data requests. As a formula, cache hit rate=(number of cache hits)/(number of cache hits+number of cache misses).

There are a number of different types of caches (e.g., caches that are utilized by GPUs or CPUs). For instance, there are fully-associative caches, direct-mapped caches, and set-associative cache. A fully-associative cache may utilize a least recently used (LRU) cache policy, where there are a number of cells (e.g., M cells) that are each capable of holding a cache line corresponding to any of the memory locations (e.g., N memory locations). In the case of cache contention, the cache line that is not accessed the longest may be kicked out and replaced with a new cache line. A direct-mapped cache may directly map a block of memory to a single cache line which it can occupy. A set-associative cache may divide the address space into equal groups, which separately act as small fully-associative caches.

A set indexing of a cache may refer to the size of the cache sets, or, i.e., how many different cache lines each data block can be mapped to. That is, the set indexing of a cache may refer to a number of cache lines that are associated with a cache set for the cache. Also, a set index (i.e., index) may be a portion of a cache address that identifies in which lines of the cache an address is found. A cache set may include the number of cache lines in the cache. An associativity of a cache may refer to the number of cache lines that are mapped to a set. That is, the associativity of a cache may refer to the number of multiple, different cache lines that are mapped to the same set. A higher associativity may result in a more efficient utilization of a cache, but may also increase the power/cost utilized by the cache. Likewise, a lower associativity may decrease the power/cost utilized by the cache, but may result in a less efficient utilization of the cache. The capacity of a cache may refer to the amount of data or information that can be stored in the cache. Additionally, the capacity or associativity of the cache may be adjusted based on a number of different factors (e.g., a cache hit rate). Further, a data allocation for a cache may be a manner in which data is allocated to a cache.

As caches may store and retrieve data from memory, in some instances, caches may experience memory latency. For instance, memory latency may be the time (i.e., latency) elapsed from an initial request for data until the data is actually retrieved. That is, memory latency may refer to time elapsed from an initiation of a request for a data (e.g., a byte or word) in memory until it is retrieved from the memory (e.g., retrieved from the memory by a processor). In comparison, memory latency measures a time elapsed to actually retrieve data from memory, while memory bandwidth measures a throughput of the memory. In some aspects, if the data is not in the memory or cache, it may take a longer period of time to obtain the data, thus resulting in an increased memory latency (e.g., the processor may have to communicate with external memory cells. For instance, memory latency may be a measure of the speed of the memory, such that a faster the reading operation will have a reduced memory latency and a slower the reading operation will have an increased memory latency. Memory latency may be expressed in different measurements of time (e.g., in actual time elapsed (such as ns) or clock cycles). Also, an average memory latency may refer to the average time elapsed from a request for data until the data is actually retrieved. The average memory latency may be calculated or determined based on an average of a number of data requests for a cache.

As mentioned herein, a cache may be utilized to store a variety of data or information (e.g., an address, some data, and some status information). A single cache may be used to store instructions and/or data (e.g., a unified cache). This type of cache may be referred to as an instruction cache (I-cache) and/or a data cache (D-cache). A "tag" may be a part of a memory address stored within a cache that identifies the main memory address associated with a line of data. For instance, the top bits of a memory address (e.g., a 64-bit address) may inform a cache where certain information came from in main memory (i.e., known as the tag). The total cache size may be a measure of the amount of data the cache can hold (e.g., random access memories (RAMs) used to hold tag values may not be included in the calculation). Additionally, the tag may take up physical space in the cache. In some aspects, it may be inefficient to store a small amount (e.g., one word) of data for each tag address, so several locations may be grouped together under the same tag. This type of logical block may be referred to as a cache line, which may refer to the smallest loadable unit of a cache (e.g., a block of contiguous words from main memory).

Additionally, a cache line may be valid when it contains cached data or instructions. Likewise, a cache line may be invalid when it does not contain cached data or instructions. Also, one or more status bits may be associated with each line of data. In some aspects, there may be a valid bit that marks the cache line as containing data that can be used. For instance, this may mean that the address tag represents some real value. In a data cache, there may be one or more dirty bits that denote whether the cache line (or part of the cache line) holds data that is not the same as (i.e., data that is newer than) the contents of main memory. Further, the data that is stored may correspond to a memory address (i.e., a location) in the cache. An "index" may be the portion of the memory address that identifies in which lines of the cache the address is found. For example, the index (e.g., the middle bits of the address) may identify the line. The index may also be used as an address for the cache RAMs and may not need storage as a part of the tag. A "way" may be a subdivision of a cache, where each way is an equal size and indexed in the same fashion. A "set" or "cache set" may include the cache lines from all of the ways that share a particular index. For instance, this may mean that the bottom few bits of the address (i.e., the offset) may not be stored in the tag. In some instance, the address of an entire line may be utilized (i.e., not each byte within the line).

Figure 7:
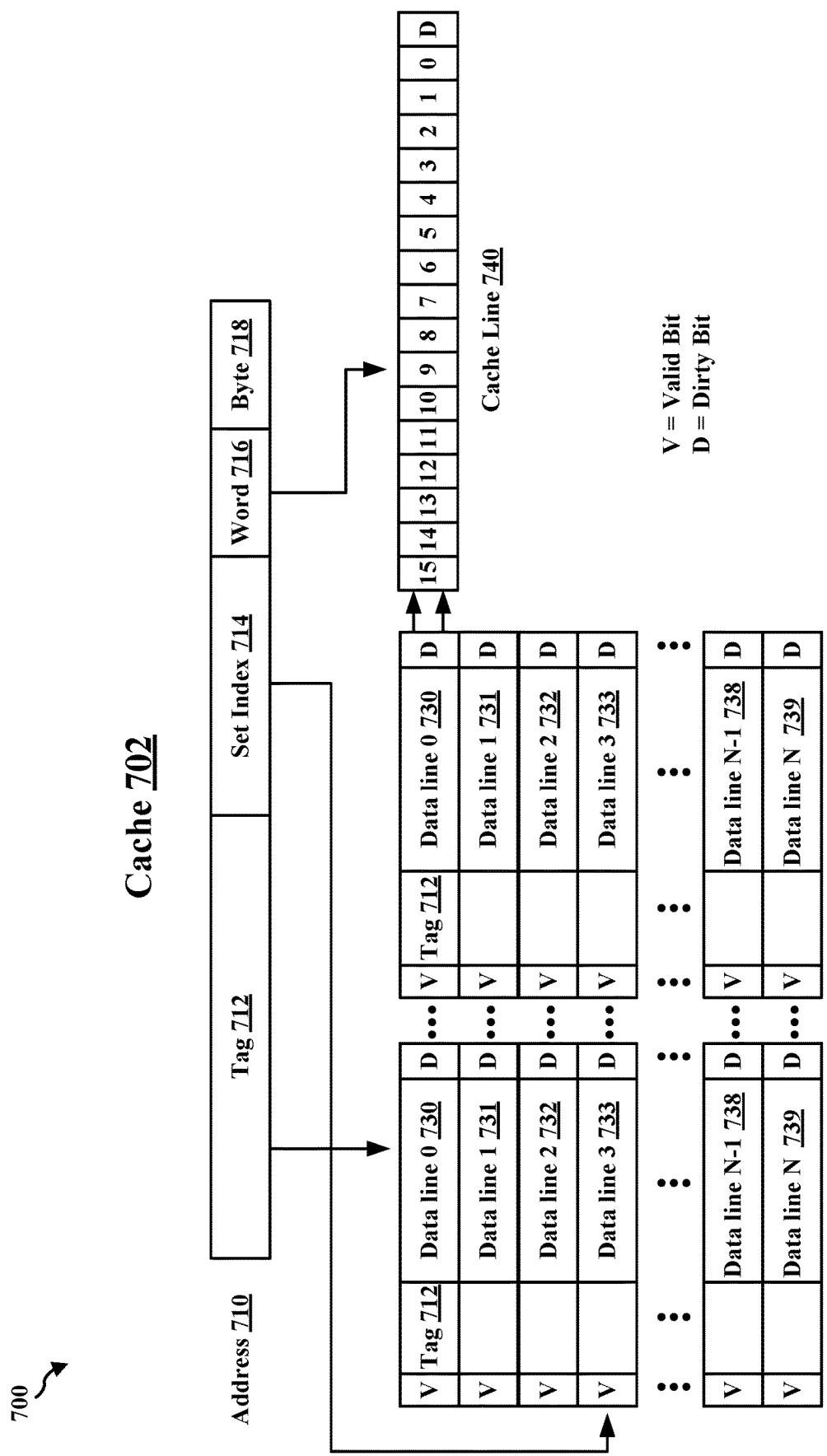
FIG. 7 is a diagram illustrating an example cache.

FIG. 7 is a diagram 700 illustrating an example address location mapping for a cache. More specifically, FIG. 7 depicts an example storage system for a cache. As shown in FIG. 7, diagram 700 of cache 702 (e.g., a set associative data cache) depicts address 710 including tag 712, set index 714, word 716, byte 718, data line 730 (e.g., data line 0), data line 731 (e.g., data line 1), data line 732 (e.g., data line 2), data line 733 (e.g., data line 3), data line 738 (e.g., data line N−1 or a 254$^{th}$ data line), data line 739 (e.g., data line N or a 255$^{th}$ data line), and cache line 740. FIG. 7 depicts that tag 712 is a part of address 710 within cache 702 that identifies the main memory address associated with a line of data. Set index 714 (i.e., index) is the portion of address 710 that identifies in which lines of the cache 702 an address is found. For example, FIG. 7 shows that there are N lines of data (e.g., 256 lines of data) in cache 702, so set index 714 identifies in which lines (e.g., lines 0-256) a certain address is found. Set index 714 may map to all data lines 730-739. Diagram 700 also shows that word 716 corresponds to the cache line 740. Moreover, FIG. 7 shows valid bits (i.e., represented by "V" in FIG. 7) and dirty bits (i.e., represented by "D" in FIG. 7) in cache 702. As shown in FIG. 7, data line 738 (e.g., data line N−1) and data line 739 (e.g., data line N) depict that cache 702 may be an N-way associative cache.

Figure 8:
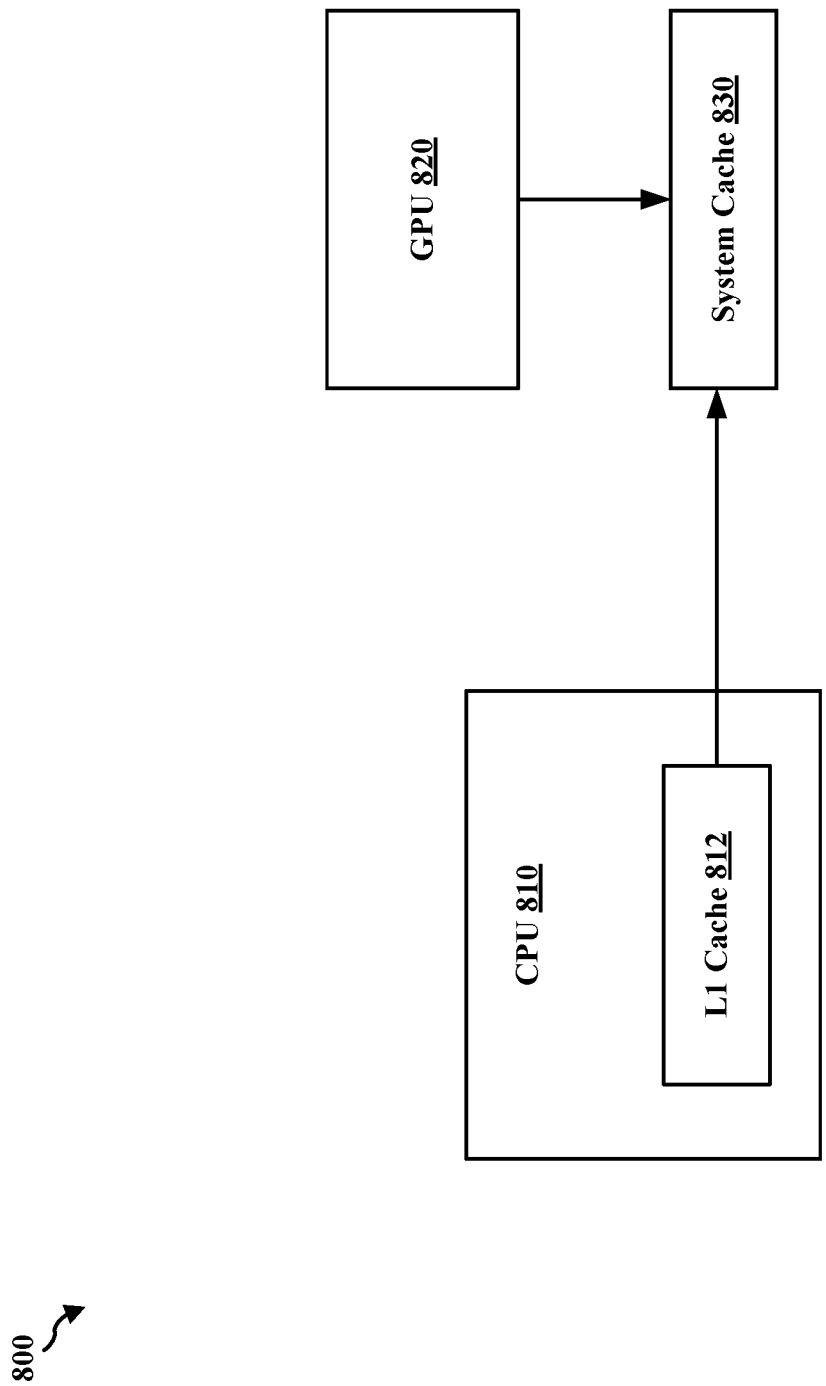
FIG. 8 is a diagram illustrating an example cache architecture.

FIG. 8 is a diagram 800 illustrating an example cache architecture. More specifically, FIG. 8 depicts an example architecture for a system cache and a layer 1 (L1) cache. As shown in FIG. 8, diagram 800 includes CPU 810 including L1 cache 812, GPU 820, and system cache 830. FIG. 8 depicts that CPU 810 may send information to system cache 830. For example, L1 cache 812 may send information to system cache 830. Also, GPU 820 may send information to system cache 830. As depicted in FIG. 8, the associativity of L1 cache 812 and/or system cache 830 may be limited due to the timing of information being transferred to/from CPU 810 and/or GPU 820. Additionally, as shown in FIG. 8, the associativity of L1 cache 812 and/or system cache 830 may be limited due to the power utilized by CPU 810 and/or GPU 820.

As depicted in FIG. 8, the associativity for caches may be limited for a number of reasons. For example, the associativity for caches may be limited for timing reasons and/or power reasons. This may lead to partitioning challenges for certain types of caches, such as jumbo caches (e.g., caches with a capacity of 32 MB or larger). As shown in FIG. 8, certain types of buffers (e.g., depth map buffers) may be smaller than a cache way. For example, depth map buffers (e.g., buffers with a capacity of 64 kB) may be much smaller than a cache way (e.g., size of 1 MB). As such, while depth map buffers may conserve cache space, they may be susceptible to cache conflicts if packed into a cache way. Accordingly, when utilizing small buffers (e.g., depth map buffers), there may be a high rate of cache conflicts. Based on the above, it may be beneficial to utilize small buffers and reduce or eliminate the rate of cache conflicts.

Aspects of the present disclosure may reduce or eliminate the rate of cache conflicts. In order to reduce or eliminate the rate of cache conflicts, aspects presented herein may utilize small buffers in order to conserve cache space. Aspects presented herein may do so by utilizing set partitioning (e.g., physical address (PA)-based set partitioning). For instance, aspects presented herein may partition or perform set partitioning based on a physical address. Physical address (PA)-based set partitioning utilized herein may provide a way to conserve cache space without being limited by associativity. For example, aspects presented herein (via PA-based set partitioning) may embed multiple set-associative caches without being limited by associativity. Aspects presented herein may make a single cache way to be associative by mapping different addresses to different sets.

Additionally, physical address (PA)-based set partitioning may ensure coherence (e.g., cache coherence), as a given physical address may always be mapped to the same set and way. Also, PA-based set partitioning may be viewed as another layer of partitioning on top of already existing partitioning schemes (e.g., way partitioning). For example, some processing units may have a limited number of ways/associativity that the processing units can allocate in the cache. Set partitioning may refer to the process of partitioning (i.e., dividing) a cache based on cache sets. Also, physical address (PA)-based set partitioning may refer to partitioning (i.e., dividing) a cache based on cache sets with physical addresses. Further, aspects presented herein may partition based on a particular physical address range, in addition to any changes in the hardware. These changes in the hardware may be to support different hash functions (e.g., 4 k, 8 k, or 16 k hash functions). For instance, these hardware changes may be based on the number of sets to be allocated for a particular buffer. Aspects presented herein may also utilize an address translation based on the physical address range (e.g., a match function). For example, aspects presented herein determine whether a particular buffer hits a particular range, and based on that match, aspects presented herein may ensure that it is allocated to a number of sets (e.g., X sets) within a certain way (i.e., a cache way).

Aspects presented herein may utilize physical address based set partitioning for a reprojection pipeline (e.g., an augmented reality (AR) reprojection pipeline). In some aspects, to save power in system-on-chips (SoCs) (e.g., AR SoCs), data/buffers may be allocated in a system cache to avoid accessing power-intensive dynamic random access memory (DRAM) (e.g., separate buffers for left eye and right eye). One issue may be that depth map buffers are much smaller than a cache and may be susceptible to cache conflicts if packed into cache. Aspects presented herein may eliminate cache conflicts for small buffers while conserving cache space by using physical address-based partitioning that provides a way to embed multiple set-associative caches without being limited by associativity. For instance, aspects presented herein may provide a coherence guaranty that is independent of a client, as a given physical address may be mapped to the same set or way. In addition, aspects presented herein may provide another layer of partitioning on top of existing partitioning (e.g., way partitioning) may control the associativity of sub-caches residing in a physical address (PA) partition.

Figure 9:
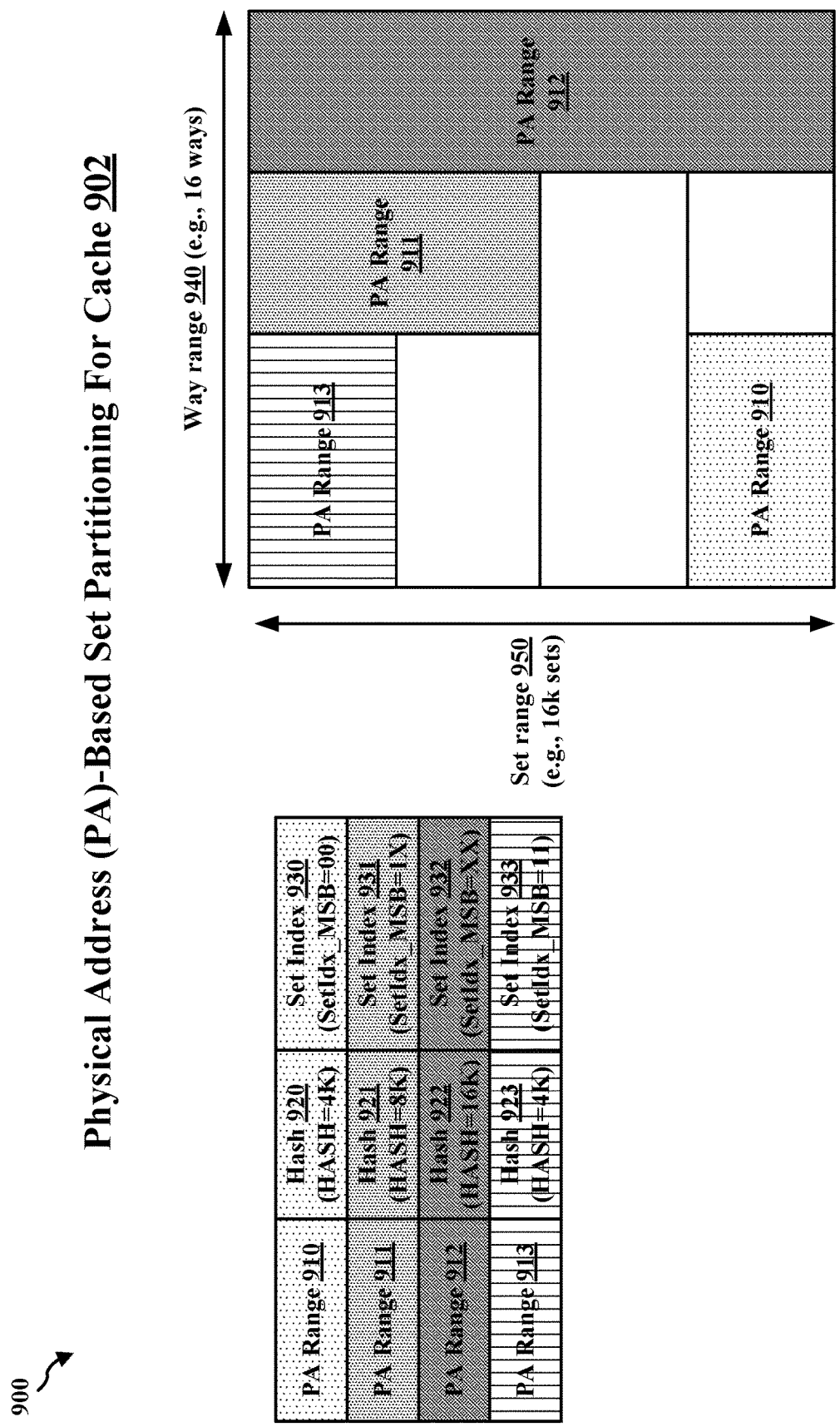
FIG. 9 is a diagram illustrating an example partitioning scheme for a cache.

FIG. 9 is a diagram 900 illustrating an example partitioning scheme for a cache. More specifically, FIG. 9 depicts an example physical address-based set partitioning scheme for caches. As shown in FIG. 9, diagram 900 includes physical address-based set partitioning scheme for cache 902 including a number of PA ranges and corresponding hash functions and set indexes. Diagram 900 shows PA range 910, hash function 920 (e.g., a 4 k hash function), set index 930, PA range 911, hash function 921 (e.g., an 8 k hash function), set index 931, PA range 912, hash function 922 (e.g., a 16 k hash function), set index 932, PA range 913, hash function 923 (e.g., a 4 k hash function), and set index 933. As depicted in FIG. 9, each of the set indexes may have a pair of most significant bits (MSBs) that are set to a certain value. For example, the MSBs for set index 930 are set to '00', the MSBs for set index 931 are set to '1X', the MSBs for set index 930 are set to 'XX', and the MSBs for set index 930 are set to '11'. FIG. 9 also depicts that the PA ranges (e.g., PA range 910, PA range 911, PA range 912, and PA range 913) may fit within a certain way range (e.g., way range 940) and a certain set range (e.g., set range 950). That is, an address range for the physical address-based set partitioning scheme may include a way range 940 (e.g., 16 cache ways) and a set range 950 (e.g., 16 k sets).

As shown in FIG. 9, there may be a number of different PA ranges (e.g., PA range 910, PA range 911, PA range 912, and PA range 913) that may be mapped to a certain number of sets. For example, as depicted in FIG. 9, PA range 910 may be mapped to a certain set range within set range 950, where the ways (i.e., cache ways) may be allocated for a particular sub-cache ID. Also, these PA ranges may correspond to a system physical space and a system cache. For instance, if the range for a certain PA range (e.g., PA range 910) is hit in the system physical space, aspects presented herein may ensure that this PA range (e.g., PA range 910) is allocated to a certain set range within the system (e.g., the lower 4K sets) for a certain amount of hash functions (e.g., 4 k hash functions). Likewise, for another PA range (e.g., PA range 911), if the range is hit in the system physical space, aspects presented herein may ensure that this PA range (e.g., PA range 911) is allocated to a certain set range within the system (e.g., 8K sets) for a certain amount of hash functions (e.g., 8 k hash functions). Also, there may be a PA range where all of the sets may be allowed (e.g., PA range 912 that is allocated to 16 k sets), such that the set index MSBs are set to a certain value (e.g., a value of 'XX'). For another PA range (e.g., PA range 913), if the range is hit in the system physical space, aspects presented herein may ensure that this PA range (e.g., PA range 913) is allocated to a certain set range within the system (e.g., 4K sets) for a certain amount of hash functions (e.g., 4 k hash functions). For PA range 913, the set index MSBs may be set to a certain value (e.g., a value of '1'). In some instances, there may be a PA range where aspects presented herein may ensure that it is allocated to all of the ways (e.g., the entire 16 k way range).

As depicted in FIG. 9, aspects presented herein may configure an address range (e.g., the range including way range 940 and set range 950) in a cache 902, where the address range is associated with data allocations for the cache 902. Aspects presented herein may also obtain a request to access data in the cache 902, where the request to access the data includes an address in the cache 902 that maps to a set index (e.g., set index 930-933), where an address value for the set index (e.g., set index 930-933)

corresponds to a portion of the address in the cache 902. Further, aspects presented herein may select, based on the address value of the set index (e.g., set index 930-933), an updated address value (e.g., PA range 910-913) for the set index (e.g., set index 930-933), where the updated address value (e.g., PA range 910-913) is associated with an updated address within the address range (e.g., the range between way range 940 and set range 950) in the cache 902, and where the updated address value corresponds to a portion of the updated address in the cache 902. Also, aspects presented herein may allocate the data in the request to the updated address value (e.g., PA range 910-913) for the set index (e.g., set index 930-933).

In some aspects, selecting the updated address value (e.g., PA range 910-913) for the set index (e.g., set index 930-933) may include: performing a physical address (PA)-based set partitioning process (e.g., the PA-based set partitioning scheme in FIG. 9) for the set index (e.g., set index 930-933) in order to obtain the updated address value (e.g., PA range 910-913) for the set index (e.g., set index 930-933). Also, performing the PA-based set partitioning process for the set index may include: parsing the address value for the set index (e.g., set index 930-933) in order to obtain the updated address value (e.g., PA range 910-913) for the set index (e.g., set index 930-933). Moreover, selecting the updated address value (e.g., PA range 910-913) for the set index (e.g., set index 930-933) may include: receiving an indication of the updated address value (e.g., PA range 910-913) for the set index (e.g., set index 930-933); and selecting the updated address value (e.g., PA range 910-913) for the set index (e.g., set index 930-933) based on the indication of the updated address value. Additionally, allocating the data in the request to the updated address value (e.g., PA range 910-913) may include: dividing the cache 902 into a plurality of address sub-ranges (e.g., each of the address ranges between way range 940 and set range 950) within the address range (e.g., the range between way range 940 and set range 950) in the cache 902; and storing the data in the request to the updated address value (e.g., PA range 910-913) in one of the plurality of address sub-ranges (e.g., each of the address ranges between way range 940 and set range 950). Further, dividing the cache 902 into the plurality of address sub-ranges may include: receiving an indication of the plurality of address sub-ranges (e.g., each of the address ranges between way range 940 and set range 950) within the address range (e.g., the range between way range 940 and set range 950), where the indication includes a starting address and an ending address for each of the plurality of address sub-ranges (e.g., each of the address ranges between way range 940 and set range 950); and dividing the cache 902 into the plurality of address sub-ranges (e.g., each of the address ranges between way range 940 and set range 950) based on the starting address and the ending address for each of the plurality of address sub-ranges (e.g., each of the address ranges between way range 940 and set range 950). Also, configuring the address range in the cache 902 may include: configuring the address range (e.g., the range between way range 940 and set range 950) based on at least one of a physical address of a memory or a client identifier (ID), where the client ID may correspond to a graphics processing unit (GPU) or a central processing unit (CPU), and where the memory may be a double data rate (DDR) memory. An address range in a cache may refer to a range of addresses within the cache or a portion of addresses within the cache.

Figure 10:
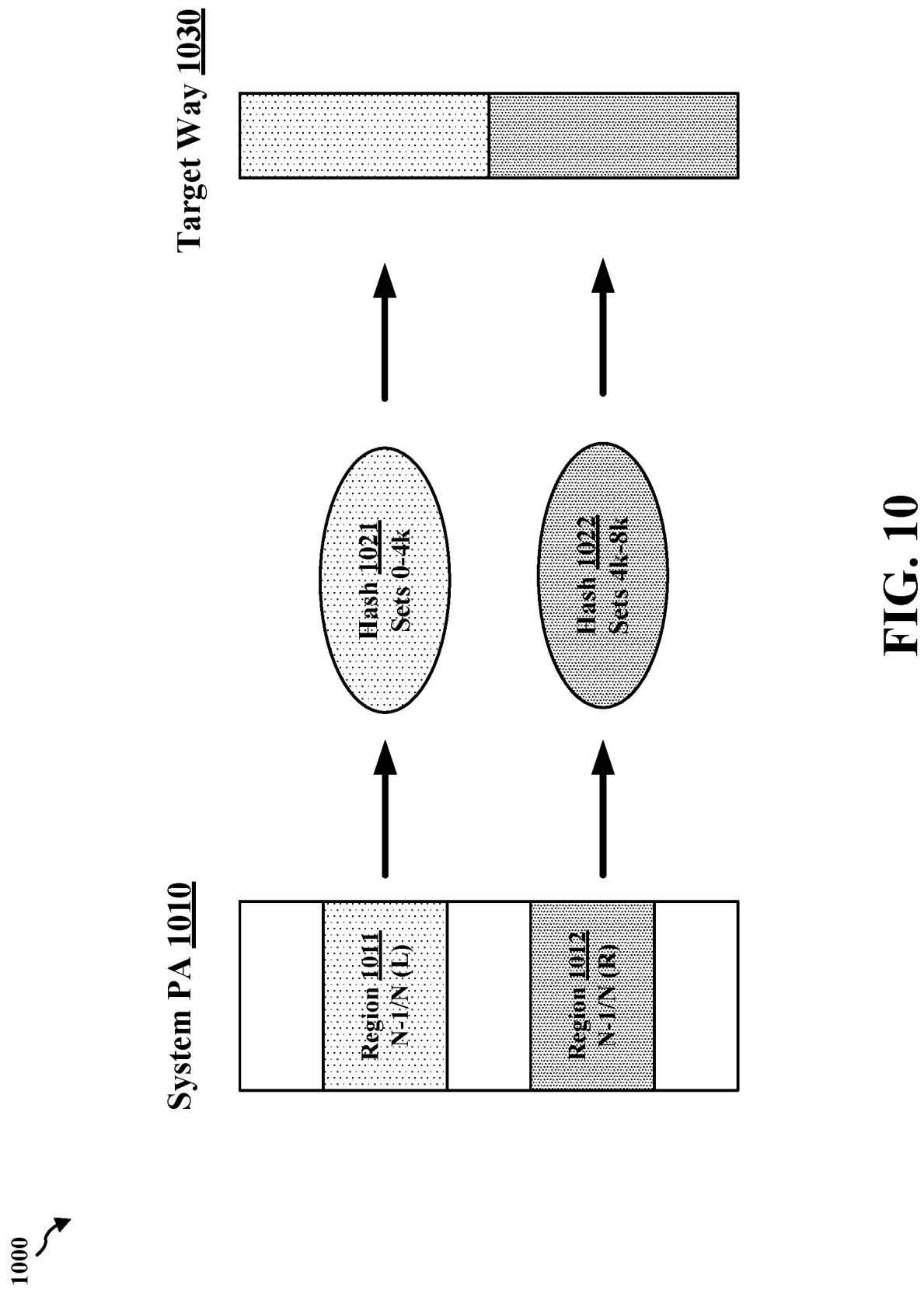
FIG. 10 is a diagram illustrating an example partitioning scheme for a cache.

FIG. 10 is a diagram 1000 illustrating an example partitioning scheme for a cache. More specifically, FIG. 10 depicts an example physical address-based set partitioning scheme for caches. As shown in FIG. 10, diagram 1000 includes physical address-based set partitioning scheme including a number of regions and corresponding hash functions and a cache way. Diagram 1000 shows system PA 1010, region 1011 and corresponding hash function 1021 (e.g., sets 0-4 k), region 1012 and corresponding hash function 1022 (e.g., sets 4 k-8 k), and target way 1030. FIG. 10 also depicts that separate PA regions may be utilized for different depth map buffers (e.g., a left eye buffer/depth map buffer for region 1011 (corresponding to a region N−1/N) and a right eye buffer/depth map buffer for region 1012 (corresponding to region N−1/N)). Additionally, FIG. 10 shows that the target cache way (e.g., target way 1030) may be divided into different set partitions (e.g., 2 set partitions) for the corresponding PA regions (e.g., region 1011 and region 1012).

As depicted in FIG. 10, in order to cache a buffer in one cache way (e.g., target way 1030) and not be self-evicting between frames, aspects herein may utilize PA-based cache partitioning. For example, aspects presented herein may make a single cache way (e.g., target way 1030) appear to be associative by mapping address ranges to different sets. In some instances, aspects presented herein may utilize software programmable registers to configure the system physical address regions. For instance, software programmable control and status register (CSRs) may be utilized for region definition. As shown in FIG. 10, there may be a certain number of regions (e.g., region 1011 and region 1012) and a certain granularity (e.g., 64 kB). In some aspects, there may be a number of configurable fields per region, where a certain bit may be enabled per region for a particular feature. For example, a start address region may include a start address (start_address) with a certain amount of aligned data (e.g., 64 kB aligned). Also, an end address region may include an end address (end_address) with a certain amount of aligned data (e.g., 64 kB aligned). There may also be a set value of set address bits (set_addr_value). And there may be a set mask of set mask bits that do not need to be forced (set_addr_mask).

Additionally, as shown in FIG. 10, the system cache may compare the incoming physical addresses. If the physical addresses map to a particular region based on a few software registers, aspects presented herein may map these physical addresses to a certain set rage (e.g., sets 0-4 k) of a cache way. In some aspects, this may be performed for both the left eye buffer/depth map buffer for the region and a right eye buffer/depth map buffer for another region. Aspects presented herein may also compare the range to make sure that addresses belong to a particular range. These addresses may then be mapped to a certain range of sets (e.g., sets 4 k-8 k) of a particular cache way. So these software programmable registers for each region may help to define the field that corresponds to an enabled bit to indicate a particular region. Also, a certain feature may be enabled for that particular region. For example, the features may be the start address, the end address, a set address value, and/or a mask. So the value may be a desired value to be forced for a particular region, and the mask may be an amount of bits of a set to be forced for a particular boundary (e.g., a 4 k boundary, an 8 k boundary 8K, or a 16 k boundary).

Aspects presented herein may include a number of benefits or advantages. For instance, aspects presented herein may efficiently cache small buffers in a system cache. For example, aspects presented herein may be utilized (e.g., in system-on-chips (SoCs)) in order to efficiently cache small buffers in a system cache. That is, aspects presented herein may be utilized (e.g., in SoCs) in order to allocate small buffers efficiently without wasting cache space. Additionally, aspects of the present disclosure may reduce or eliminate the rate of cache conflicts. In order to reduce or eliminate the rate of cache conflicts, aspects presented herein may utilize small buffers in order to conserve cache space. Aspects presented herein may do so by utilizing set partitioning (e.g., physical address (PA)-based set partitioning). For instance, aspects presented herein may partition or perform set partitioning based on a physical address. PA-based set partitioning may provide aspects presented herein with a way to conserve cache space without being limited by associativity. For example, aspects presented herein (via PA-based set partitioning) may embed multiple set-associative caches without being limited by associativity.

Figure 11:
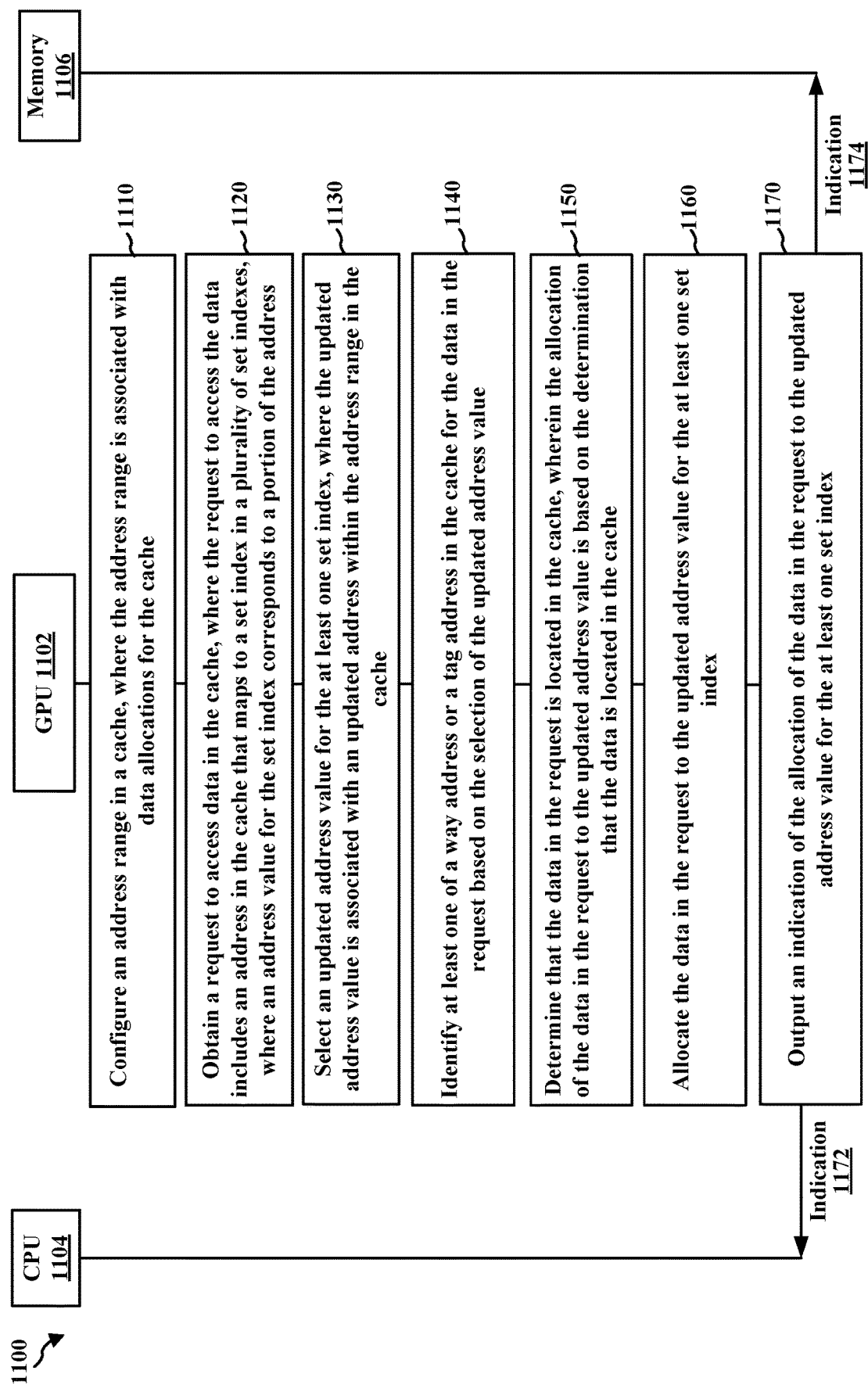
FIG. 11 is a communication flow diagram illustrating example communications between a GPU, a CPU, and a memory.

FIG. 11 is a communication flow diagram 1100 of data processing or graphics processing in accordance with one or more techniques of this disclosure. As shown in FIG. 11, diagram 1100 includes example communications between GPU 1102 (e.g., a GPU, a cache at a GPU, a GPU component, another graphics processor, a CPU, a CPU component, or another central processor), CPU 1104 (e.g., a CPU, a cache at a CPU, a CPU component, another central processor, a GPU, a GPU component, or another graphics processor), and memory 1106 (e.g., a system memory, a graphics memory, or a memory or cache at a GPU), in accordance with one or more techniques of this disclosure.

At 1110, GPU 1102 may configure an address range in a cache, where the address range is associated with data allocations for the cache. In some aspects, configuring the address range in the cache may include: configuring the address range based on at least one of a physical address of a memory or a client identifier (ID). The client ID may correspond to a graphics processing unit (GPU) or a central processing unit (CPU), and the memory may be a double data rate (DDR) memory. The address range may include a range of ways and a range of sets in the cache, where the updated address associated with the updated address value for the set index may correspond to a portion of the range of ways and a portion of the range of sets. In some instances, configuring the address range in the cache may include: obtaining an indication of the address range in the cache, and selecting the updated address value for the set index may include: selecting the updated address value for the set index based on the indication of the address range. In some instances, prior to configuring the address range in the cache, the GPU may receive an indication or a request to configure the address range in the cache. In some aspects, the set index may be at least one set index, one or more set indexes, multiple set indexes, or a set of set indexes. As discussed herein, a "set" of an article may refer to a group of "one or more" of the article, or any appropriate amount of the article. For example, "a set of set indexes" may refer to "one or more set indexes" or any appropriate amount of set indexes.

At 1120, GPU 1102 may obtain a request to access data in the cache, where the request to access the data includes an address in the cache that maps to a set index in a plurality of set indexes, where an address value for the set index corresponds to a portion of the address in the cache. In some aspects, obtaining the request to access the data may include: obtaining the request to store or load the data in the cache, and the selection of the updated address value for the set index may be based on the request to store or load the data in the cache.

At 1130, GPU 1102 may select, based on the address value of the set index, an updated address value for the set index, where the updated address value is associated with an updated address within the address range in the cache, and where the updated address value corresponds to a portion of the updated address in the cache. In some aspects, selecting the updated address value for the set index may include: performing a physical address (PA)-based set partitioning process for the set index in order to obtain the updated address value for the set index. Also, performing the PA-based set partitioning process for the set index may include: parsing the address value for the set index in order to obtain the updated address value for the set index. Further, selecting the updated address value for the set index may include: receiving an indication of the updated address value for the set index; and selecting the updated address value for the set index based on the indication of the updated address value. The indication of the updated address value may be based on at least one of: a physical address of a memory or a client identifier (ID). In some aspects, selecting the updated address value for the set index may include: overwriting the address value to the updated address value for the set index. Additionally, selecting the updated address value for the set index may include: adjusting a mapping of the address value to be an updated mapping that includes the updated address value for the set index. In some instances, the address range in the cache may correspond to a mapping for a plurality of set indices including the set index, and selecting the updated address value for the set index may include: selecting the updated address value for the set index within the address range corresponding to the mapping. In some aspects, the updated address value for the set index may be at least one updated set address in the cache, and selecting the updated address value for the set index may include: selecting the at least one updated set address in the cache. Also, the updated address within the address range in the cache may correspond to a number of sets in the cache, and the number of sets in the cache may be associated with at least one of a size of the cache or an associativity of the cache.

At 1140, GPU 1102 may identify at least one of a way address or a tag address in the cache for the data in the request based on the selection of the updated address value for the set index, where the way address and the tag address in the cache correspond to the portion of the updated address in the cache.

At 1150, GPU 1102 may determine that the data in the request is located in the cache (e.g., determine that there is a cache hit), where an allocation of the data in the request to the updated address value for the set index is based on the determination that the data is located in the cache.

At 1160, GPU 1102 may allocate the data in the request to the updated address value for the set index. In some aspects, allocating the data in the request to the updated address value may include: dividing the cache into a plurality of address sub-ranges within the address range in the cache; and storing the data in the request to the updated address value in one of the plurality of address sub-ranges. Also, dividing the cache into the plurality of address sub-ranges may include: receiving an indication of the plurality of address sub-ranges within the address range, where the indication includes a starting address and an ending address for each of the plurality of address sub-ranges; and dividing the cache into the plurality of address sub-ranges based on the starting address and the ending address for each of the plurality of address sub-ranges. In some instances, allocating the data in the request to the updated address value may include: writing the data in the request to the updated address value for the set index.

At 1170, GPU 1102 may output an indication of the allocation of the data in the request to the updated address value for the set index. In some aspects, outputting the indication of the allocation of the data may include: transmitting, to a graphics processing unit (GPU), a central processing unit (CPU), or a digital signal processor (DSP), the indication of the allocation of the data to the updated address value for the set index, where an amount of the plurality of set indexes is based on the transmission of the indication to the GPU, the CPU, or the DSP. For example, the GPU may transmit the indication of the allocation of the data to the updated address value for the set index (e.g., GPU 1102 may transmit indication 1172 to CPU 1104). Also, outputting the indication of the allocation of the data may include: storing, in a memory, the indication of the allocation of the data to the updated address value for the set index. For example, the GPU may store the indication of the allocation of the data to the updated address value for the set index (e.g., GPU 1102 may store indication 1174 in memory 1106).

Figure 12:
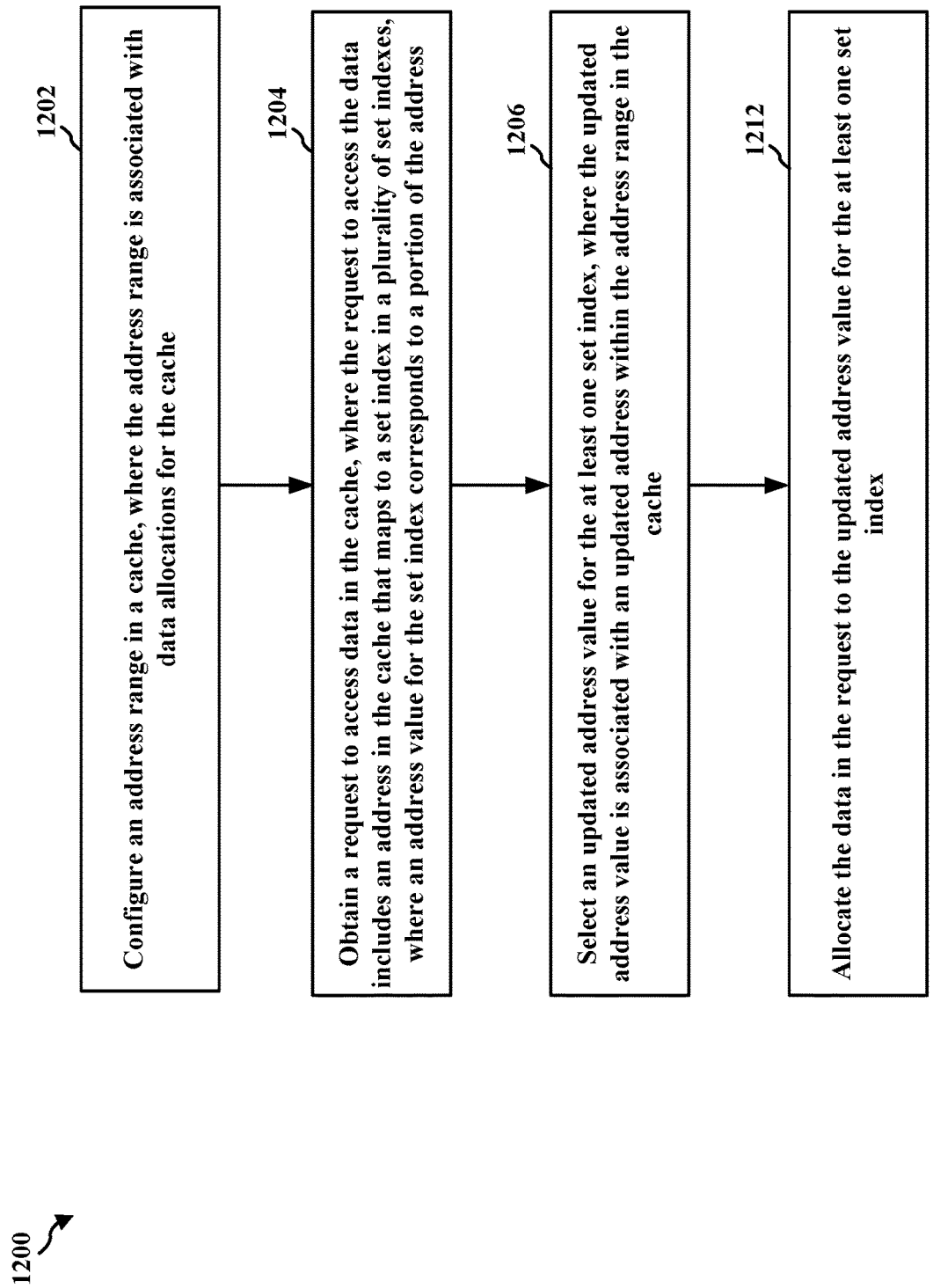
FIG. 12 is a flowchart of an example method of data processing.

FIG. 12 is a flowchart 1200 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-11.

At 1202, the GPU may configure an address range in a cache, where the address range is associated with data allocations for the cache, as described in connection with the examples in FIGS. 1-11. For example, as described in 1110 of FIG. 11, GPU 1102 may configure an address range in a cache, where the address range is associated with data allocations for the cache. Further, step 1202 may be performed by processing unit 120 in FIG. 1. In some aspects, configuring the address range in the cache may include: configuring the address range based on at least one of a physical address of a memory or a client identifier (ID). The client ID may correspond to a graphics processing unit (GPU) or a central processing unit (CPU), and the memory may be a double data rate (DDR) memory. The address range may include a range of ways and a range of sets in the cache, where the updated address associated with the updated address value for the set index may correspond to a portion of the range of ways and a portion of the range of sets. In some instances, configuring the address range in the cache may include: obtaining an indication of the address range in the cache, and selecting the updated address value for the set index may include: selecting the updated address value for the set index based on the indication of the address range. In some instances, prior to configuring the address range in the cache, the GPU may receive an indication or a request to configure the address range in the cache.

At 1204, the GPU may obtain a request to access data in the cache, where the request to access the data includes an address in the cache that maps to a set index in a plurality of set indexes, where an address value for the set index corresponds to a portion of the address in the cache, as described in connection with the examples in FIGS. 1-11. For example, as described in 1120 of FIG. 11, GPU 1102 may obtain a request to access data in the cache, where the request to access the data includes an address in the cache that maps to a set index in a plurality of set indexes, where an address value for the set index corresponds to a portion of the address in the cache. Further, step 1204 may be performed by processing unit 120 in FIG. 1. In some aspects, obtaining the request to access the data may include: obtaining the request to store or load the data in the cache, and the selection of the updated address value for the set index may be based on the request to store or load the data in the cache.

At 1206, the GPU may select, based on the address value of the set index, an updated address value for the set index, where the updated address value is associated with an updated address within the address range in the cache, and where the updated address value corresponds to a portion of the updated address in the cache, as described in connection with the examples in FIGS. 1-11. For example, as described in 1130 of FIG. 11, GPU 1102 may select, based on the address value of the set index, an updated address value for the set index, where the updated address value is associated with an updated address within the address range in the cache, and where the updated address value corresponds to a portion of the updated address in the cache. Further, step 1206 may be performed by processing unit 120 in FIG. 1. In some aspects, selecting the updated address value for the set index may include: performing a physical address (PA)-based set partitioning process for the set index in order to obtain the updated address value for the set index. Also, performing the PA-based set partitioning process for the set index may include: parsing the address value for the set index in order to obtain the updated address value for the set index. Further, selecting the updated address value for the set index may include: receiving an indication of the updated address value for the set index; and selecting the updated address value for the set index based on the indication of the updated address value. The indication of the updated address value may be based on at least one of: a physical address of a memory or a client identifier (ID). In some aspects, selecting the updated address value for the set index may include: overwriting the address value to the updated address value for the set index. Additionally, selecting the updated address value for the set index may include: adjusting a mapping of the address value to be an updated mapping that includes the updated address value for the set index. In some instances, the address range in the cache may correspond to a mapping for a plurality of set indices including the set index, and selecting the updated address value for the set index may include: selecting the updated address value for the set index within the address range corresponding to the mapping. In some aspects, the updated address value for the set index may be at least one updated set address in the cache, and selecting the updated address value for the set index may include: selecting the at least one updated set address in the cache. Also, the updated address within the address range in the cache may correspond to a number of sets in the cache, and the number of sets in the cache may be associated with at least one of a size of the cache or an associativity of the cache.

At 1212, the GPU may allocate the data in the request to the updated address value for the set index, as described in connection with the examples in FIGS. 1-11. For example, as described in 1160 of FIG. 11, GPU 1102 may allocate the data in the request to the updated address value for the set index. Further, step 1212 may be performed by processing unit 120 in FIG. 1. In some aspects, allocating the data in the request to the updated address value may include: dividing the cache into a plurality of address sub-ranges within the address range in the cache; and storing the data in the request to the updated address value in one of the plurality of address sub-ranges. Also, dividing the cache into the plurality of address sub-ranges may include: receiving an indication of the plurality of address sub-ranges within the address range, where the indication includes a starting address and an ending address for each of the plurality of address sub-ranges; and dividing the cache into the plurality of address sub-ranges based on the starting address and the ending address for each of the plurality of address sub-ranges. In some instances, allocating the data in the request to the updated address value may include: writing the data in the request to the updated address value for the set index.

Figure 13:
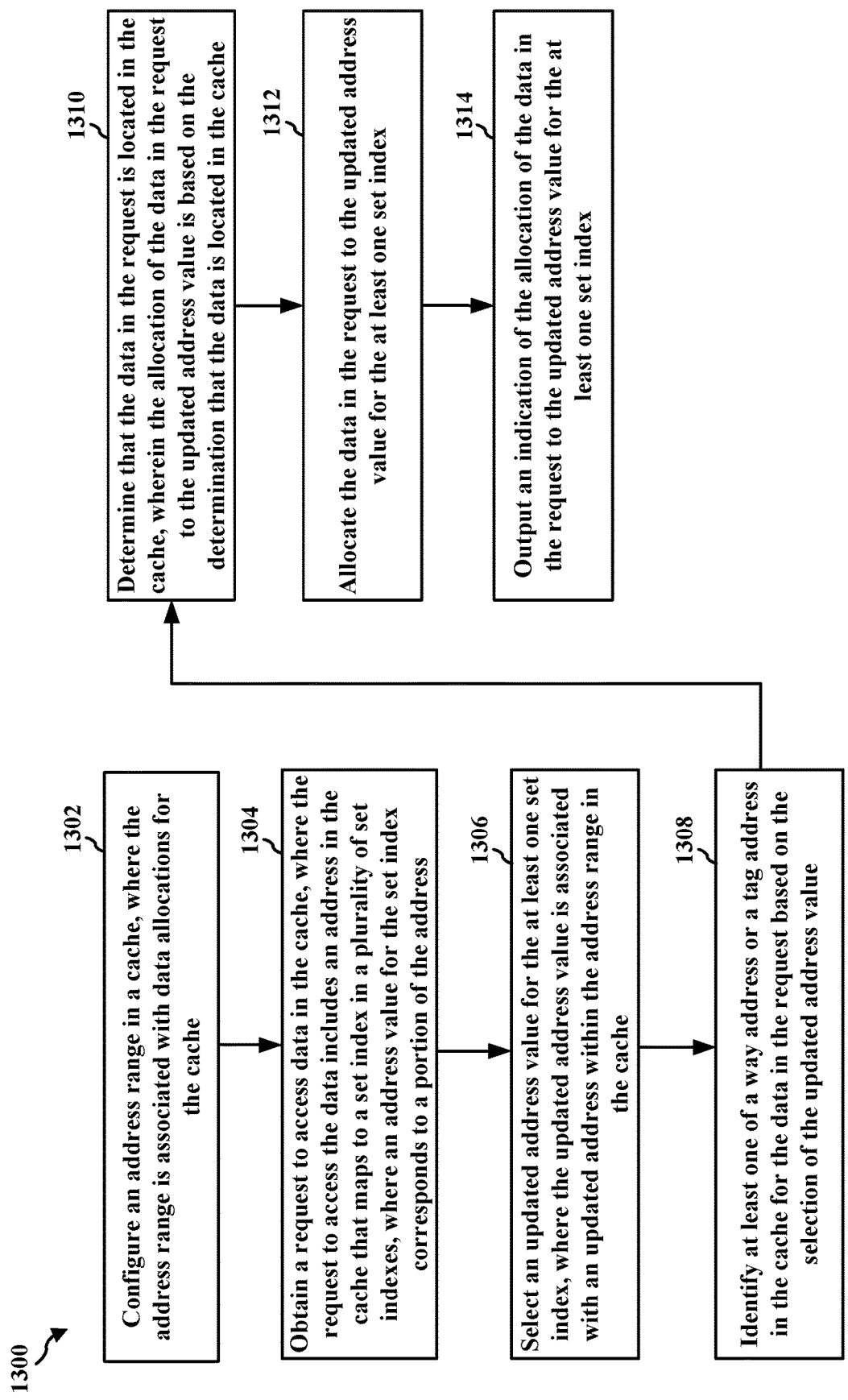
FIG. 13 is a flowchart of an example method of data processing.

FIG. 13 is a flowchart 1300 of an example method of data processing or graphics processing in accordance with one or more techniques of this disclosure. The method may be performed by a GPU (e.g., a GPU, a cache at a GPU, a GPU component, another graphics processor, a CPU, a CPU component, or another central processor), a CPU (e.g., a CPU, a cache at a CPU, a CPU component, another central processor, a GPU, a GPU component, or another graphics processor), a display driver integrated circuit (DDIC), an apparatus for data or graphics processing, a wireless communication device, and/or any apparatus that may perform data or graphics processing as used in connection with the examples of FIGS. 1-11.

At 1302, the GPU may configure an address range in a cache, where the address range is associated with data allocations for the cache, as described in connection with the examples in FIGS. 1-11. For example, as described in 1110 of FIG. 11, GPU 1102 may configure an address range in a cache, where the address range is associated with data allocations for the cache. Further, step 1302 may be performed by processing unit 120 in FIG. 1. In some aspects, configuring the address range in the cache may include: configuring the address range based on at least one of a physical address of a memory or a client identifier (ID). The client ID may correspond to a graphics processing unit (GPU) or a central processing unit (CPU), and the memory may be a double data rate (DDR) memory. The address range may include a range of ways and a range of sets in the cache, where the updated address associated with the updated address value for the set index may correspond to a portion of the range of ways and a portion of the range of sets. In some instances, configuring the address range in the cache may include: obtaining an indication of the address range in the cache, and selecting the updated address value for the set index may include: selecting the updated address value for the set index based on the indication of the address range. In some instances, prior to configuring the address range in the cache, the GPU may receive an indication or a request to configure the address range in the cache.

At 1304, the GPU may obtain a request to access data in the cache, where the request to access the data includes an address in the cache that maps to a set index in a plurality of set indexes, where an address value for the set index corresponds to a portion of the address in the cache, as described in connection with the examples in FIGS. 1-11. For example, as described in 1120 of FIG. 11, GPU 1102 may obtain a request to access data in the cache, where the request to access the data includes an address in the cache that maps to a set index in a plurality of set indexes, where an address value for the set index corresponds to a portion of the address in the cache. Further, step 1304 may be performed by processing unit 120 in FIG. 1. In some aspects, obtaining the request to access the data may include: obtaining the request to store or load the data in the cache, and the selection of the updated address value for the set index may be based on the request to store or load the data in the cache.

At 1306, the GPU may select, based on the address value of the set index, an updated address value for the set index, where the updated address value is associated with an updated address within the address range in the cache, and where the updated address value corresponds to a portion of the updated address in the cache, as described in connection with the examples in FIGS. 1-11. For example, as described in 1130 of FIG. 11, GPU 1102 may select, based on the address value of the set index, an updated address value for the set index, where the updated address value is associated with an updated address within the address range in the cache, and where the updated address value corresponds to a portion of the updated address in the cache. Further, step 1306 may be performed by processing unit 120 in FIG. 1. In some aspects, selecting the updated address value for the set index may include: performing a physical address (PA)-based set partitioning process for the set index in order to obtain the updated address value for the set index. Also, performing the PA-based set partitioning process for the set index may include: parsing the address value for the set index in order to obtain the updated address value for the set index. Further, selecting the updated address value for the set index may include: receiving an indication of the updated address value for the set index; and selecting the updated address value for the set index based on the indication of the updated address value. The indication of the updated address value may be based on at least one of: a physical address of a memory or a client identifier (ID). In some aspects, selecting the updated address value for the set index may include: overwriting the address value to the updated address value for the set index. Additionally, selecting the updated address value for the set index may include: adjusting a mapping of the address value to be an updated mapping that includes the updated address value for the set index. In some instances, the address range in the cache may correspond to a mapping for a plurality of set indices including the set index, and selecting the updated address value for the set index may include: selecting the updated address value for the set index within the address range corresponding to the mapping. In some aspects, the updated address value for the set index may be at least one updated set address in the cache, and selecting the updated address value for the set index may include: selecting the at least one updated set address in the cache. Also, the updated address within the address range in the cache may correspond to a number of sets in the cache, and the number of sets in the cache may be associated with at least one of a size of the cache or an associativity of the cache.

At 1308, the GPU may identify at least one of a way address or a tag address in the cache for the data in the request based on the selection of the updated address value for the set index, where the way address and the tag address in the cache correspond to the portion of the updated address in the cache, as described in connection with the examples in FIGS. 1-11. For example, as described in 1140 of FIG. 11, GPU 1102 may identify at least one of a way address or a tag address in the cache for the data in the request based on the selection of the updated address value for the set index, where the way address and the tag address in the cache correspond to the portion of the updated address in the cache. Further, step 1308 may be performed by processing unit 120 in FIG. 1.

At 1310, the GPU may determine that the data in the request is located in the cache (e.g., determine that there is a cache hit), where an allocation of the data in the request to the updated address value for the set index is based on the determination that the data is located in the cache, as described in connection with the examples in FIGS. 1-11. For example, as described in 1150 of FIG. 11, GPU 1102 may determine that the data in the request is located in the cache (e.g., determine that there is a cache hit), where an allocation of the data in the request to the updated address value for the set index is based on the determination that the data is located in the cache. Further, step 1310 may be performed by processing unit 120 in FIG. 1.

At 1312, the GPU may allocate the data in the request to the updated address value for the set index, as described in connection with the examples in FIGS. 1-11. For example, as described in 1160 of FIG. 11, GPU 1102 may allocate the data in the request to the updated address value for the set index. Further, step 1312 may be performed by processing unit 120 in FIG. 1. In some aspects, allocating the data in the request to the updated address value may include: dividing the cache into a plurality of address sub-ranges within the address range in the cache; and storing the data in the request to the updated address value in one of the plurality of address sub-ranges. Also, dividing the cache into the plurality of address sub-ranges may include: receiving an indication of the plurality of address sub-ranges within the address range, where the indication includes a starting address and an ending address for each of the plurality of address sub-ranges; and dividing the cache into the plurality of address sub-ranges based on the starting address and the ending address for each of the plurality of address sub-ranges. In some instances, allocating the data in the request to the updated address value may include: writing the data in the request to the updated address value for the set index.

At 1314, the GPU may output an indication of the allocation of the data in the request to the updated address value for the set index, as described in connection with the examples in FIGS. 1-11. For example, as described in 1170 of FIG. 11, GPU 1102 may output an indication of the allocation of the data in the request to the updated address value for the set index. Further, step 1314 may be performed by processing unit 120 in FIG. 1. In some aspects, outputting the indication of the allocation of the data may include: transmitting, to a graphics processing unit (GPU), a central processing unit (CPU), or a digital signal processor (DSP), the indication of the allocation of the data to the updated address value for the set index, where an amount of the plurality of set indexes is based on the transmission of the indication to the GPU, the CPU, or the DSP. For example, the GPU may transmit the indication of the allocation of the data to the updated address value for the set index. Also, outputting the indication of the allocation of the data may include: storing, in a memory, the indication of the allocation of the data to the updated address value for the set index. For example, the GPU may store the indication of the allocation of the data to the updated address value for the set index.

In configurations, a method or an apparatus for data or graphics processing is provided. The apparatus may be a GPU (or other graphics processor), a CPU (or other central processor), a DDIC, an apparatus for graphics processing, and/or some other processor that may perform data or graphics processing. In aspects, the apparatus may be the processing unit 120 within the device 104, or may be some other hardware within the device 104 or another device. The apparatus, e.g., processing unit 120, may include means for configuring an address range in a cache, where the address range is associated with data allocations for the cache. The apparatus, e.g., processing unit 120, may also include means for a request to access data in the cache, where the request to access the data includes an address in the cache that maps to a set index in a plurality of set indexes, where an address value for the set index corresponds to a portion of the address in the cache. The apparatus, e.g., processing unit 120, may also include means for selecting, based on the address value of the set index, an updated address value for the set index, where the updated address value is associated with an updated address within the address range in the cache, and where the updated address value corresponds to a portion of the updated address in the cache. The apparatus, e.g., processing unit 120, may also include means for allocating the data in the request to the updated address value for the set index. The apparatus, e.g., processing unit 120, may also include means for identifying at least one of a way address or a tag address in the cache for the data in the request based on the selection of the updated address value for the set index, where the way address and the tag address in the cache correspond to the portion of the updated address in the cache. The apparatus, e.g., processing unit 120, may also include means for determining that the data in the request is located in the cache, where the allocation of the data in the request to the updated address value for the set index is based on the determination that the data is located in the cache. The apparatus, e.g., processing unit 120, may also include means for outputting an indication of the allocation of the data in the request to the updated address value for the set index.

The subject matter described herein may be implemented to realize one or more benefits or advantages. For instance, the described data or graphics processing techniques may be used by a cache, a GPU, a CPU, a central processor, or some other processor that may perform data or graphics processing to implement the physical address based set partitioning techniques described herein. This may also be accomplished at a low cost compared to other data or graphics processing techniques. Moreover, the data or graphics processing techniques herein may improve or speed up data processing or execution. Further, the data or graphics processing techniques herein may improve resource or data utilization and/or resource efficiency. Additionally, aspects of the present disclosure may utilize physical address based set partitioning techniques in order to improve memory bandwidth efficiency and/or increase processing speed at a cache, a GPU, a CPU, or a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for data processing, including at least one memory and at least one processor coupled to the at least one memory and, based at least in part on information stored in the at least one memory, the at least one processor, individually or in any combination, is configured to: configure an address range in a cache, wherein the address range is associated with data allocations for the cache; obtain a request to access data in the cache, wherein the request to access the data includes an address in the cache that maps to a set index in a plurality of set indexes, wherein an address value for the set index corresponds to a portion of the address in the cache; select, based on the address value of the set index, an updated address value for the set index, wherein the updated address value is associated with an updated address within the address range in the cache, and wherein the updated address value corresponds to a portion of the updated address in the cache; and allocate the data in the request to the updated address value for the set index.

Aspect 2 is the apparatus of aspect 1, where to select the updated address value for the set index, the at least one processor, individually or in any combination, is configured to: perform a physical address (PA)-based set partitioning process for the set index in order to obtain the updated address value for the set index.

Aspect 3 is the apparatus of aspect 2, where to perform the PA-based set partitioning process for the set index, the at least one processor, individually or in any combination, is configured to: parse the address value for the set index in order to obtain the updated address value for the set index.

Aspect 4 is the apparatus of any of aspects 1 to 3, where to select the updated address value for the set index, the at least one processor, individually or in any combination, is configured to: receive an indication of the updated address value for the set index; and select the updated address value for the set index based on the indication of the updated address value.

Aspect 5 is the apparatus of aspect 4, where the indication of the updated address value is based on at least one of: a physical address of a memory or a client identifier (ID).

Aspect 6 is the apparatus of any of aspects 1 to 5, where to allocate the data in the request to the updated address value, the at least one processor, individually or in any combination, is configured to: divide the cache into a plurality of address sub-ranges within the address range in the cache; and store the data in the request to the updated address value in one of the plurality of address sub-ranges.

Aspect 7 is the apparatus of aspect 6, where to divide the cache into the plurality of address sub-ranges, the at least one processor, individually or in any combination, is configured to: receive an indication of the plurality of address sub-ranges within the address range, wherein the indication includes a starting address and an ending address for each of the plurality of address sub-ranges; and divide the cache into the plurality of address sub-ranges based on the starting address and the ending address for each of the plurality of address sub-ranges.

Aspect 8 is the apparatus of any of aspects 1 to 7, where to configure the address range in the cache, the at least one processor, individually or in any combination, is configured to: configure the address range based on at least one of a physical address of a memory or a client identifier (ID).

Aspect 9 is the apparatus of aspect 8, where the client ID corresponds to a graphics processing unit (GPU) or a central processing unit (CPU), and wherein the memory is a double data rate (DDR) memory.

Aspect 10 is the apparatus of any of aspects 1 to 9, where the address range includes a range of ways and a range of sets in the cache, wherein the updated address associated with the updated address value for the set index corresponds to a portion of the range of ways and a portion of the range of sets.

Aspect 11 is the apparatus of any of aspects 1 to 10, where to select the updated address value for the set index, the at least one processor, individually or in any combination, is configured to: overwrite the address value to the updated address value for the set index.

Aspect 12 is the apparatus of any of aspects 1 to 11, where to select the updated address value for the set index, the at least one processor, individually or in any combination, is configured to: adjust a mapping of the address value to be an updated mapping that includes the updated address value for the set index.

Aspect 13 is the apparatus of any of aspects 1 to 12, where the address range in the cache corresponds to a mapping for a plurality of set indices including the set index, and wherein to select the updated address value for the set index, the at least one processor, individually or in any combination, is configured to: select the updated address value for the set index within the address range corresponding to the mapping.

Aspect 14 is the apparatus of any of aspects 1 to 13, where the at least one processor, individually or in any combination, is further configured to: identify at least one of a way address or a tag address in the cache for the data in the request based on the selection of the updated address value for the set index, wherein the way address and the tag address in the cache correspond to the portion of the updated address in the cache.

Aspect 15 is the apparatus of any of aspects 1 to 14, where the at least one processor, individually or in any combination, is further configured to: determine that the data in the request is located in the cache, wherein the allocation of the data in the request to the updated address value for the set index is based on the determination that the data is located in the cache.

Aspect 16 is the apparatus of any of aspects 1 to 15, where the at least one processor, individually or in any combination, is further configured to: output an indication of the allocation of the data in the request to the updated address value for the set index.

Aspect 17 is the apparatus of aspect 16, where to output the indication of the allocation of the data, the at least one processor, individually or in any combination, is configured to: transmit, to a graphics processing unit (GPU), a central processing unit (CPU), or a digital signal processor (DSP), the indication of the allocation of the data to the updated address value for the set index, wherein an amount of the plurality of set indexes is based on the transmission of the indication to the GPU, the CPU, or the DSP.

Aspect 18 is the apparatus of aspect 16, where to output the indication of the allocation of the data, the at least one processor, individually or in any combination, is configured to: store, in a memory, the indication of the allocation of the data to the updated address value for the set index.

Aspect 19 is the apparatus of any of aspects 1 to 18, where to configure the address range in the cache, the at least one processor, individually or in any combination, is configured to: obtain an indication of the address range in the cache, and wherein to select the updated address value for the set index, the at least one processor, individually or in any combination, is configured to: select the updated address value for the set index based on the indication of the address range.

Aspect 20 is the apparatus of any of aspects 1 to 19, where to allocate the data in the request to the updated address value, the at least one processor, individually or in any combination, is configured to: write the data in the request to the updated address value for the set index.

Aspect 21 is the apparatus of any of aspects 1 to 20, where to obtain the request to access the data, the at least one processor, individually or in any combination, is configured to: obtain the request to store or load the data in the cache, and wherein the selection of the updated address value for the set index is based on the request to store or load the data in the cache.

Aspect 22 is the apparatus of any of aspects 1 to 21, where the updated address value for the set index is at least one updated set address in the cache, and wherein to select the updated address value for the set index, the at least one processor, individually or in any combination, is configured to: select the at least one updated set address in the cache.

Aspect 23 is the apparatus of any of aspects 1 to 22, where the updated address within the address range in the cache corresponds to a number of sets in the cache, and where the number of sets in the cache is associated with at least one of a size of the cache or an associativity of the cache.

Aspect 24 is the apparatus of any of aspects 1 to 23, further including (i.e., comprising): at least one of an antenna or a transceiver coupled to the at least one processor, and where to obtain the request to access the data in the cache, the at least one processor, individually or in any combination, is configured to: obtain, via at least one of the antenna or the transceiver, the request to access the data in the cache.

Aspect 25 is a method of data processing for implementing any of aspects 1 to 24.

Aspect 26 is an apparatus for data processing including means for implementing any of aspects 1 to 24.

Aspect 27 is a computer-readable medium (e.g., a non-transitory computer-readable medium) storing computer executable code (e.g., code for data processing), the code when executed by at least one processor causes the at least one processor to implement any of aspects 1 to 24.

What is claimed is:

1. An apparatus for data processing, comprising:
at least one memory; and
at least one processor coupled to the at least one memory and, based at least in part on information stored in the at least one memory, the at least one processor, individually or in any combination, is configured to:
configure an address range in a cache, wherein the address range is associated with data allocations for the cache;
obtain a request to access data in the cache, wherein the request to access the data includes an address in the cache that maps to a set index in a plurality of set indexes, wherein an address value for the set index corresponds to a portion of the address in the cache;
select, based on the address value of the set index, an updated address value for the set index, wherein the updated address value is associated with an updated address within the address range in the cache, and wherein the updated address value corresponds to a portion of the updated address in the cache; and
allocate the data in the request to the updated address value for the set index.

2. The apparatus of claim 1, wherein to select the updated address value for the set index, the at least one processor, individually or in any combination, is configured to: perform a physical address (PA)-based set partitioning process for the set index in order to obtain the updated address value for the set index.

3. The apparatus of claim 2, wherein to perform the PA-based set partitioning process for the set index, the at least one processor, individually or in any combination, is configured to: parse the address value for the set index in order to obtain the updated address value for the set index.

4. The apparatus of claim 1, wherein to select the updated address value for the set index, the at least one processor, individually or in any combination is configured to:
receive an indication of the updated address value for the set index; and
select the updated address value for the set index based on the indication of the updated address value.

5. The apparatus of claim 4, wherein the indication of the updated address value is based on at least one of: a physical address of a memory or a client identifier (ID).

6. The apparatus of claim 1, wherein to allocate the data in the request to the updated address value, the at least one processor, individually or in any combination, is configured to:
divide the cache into a plurality of address sub-ranges within the address range in the cache; and
store the data in the request to the updated address value in one of the plurality of address sub-ranges.

7. The apparatus of claim 6, wherein to divide the cache into the plurality of address sub-ranges, the at least one processor, individually or in any combination, is configured to:
receive an indication of the plurality of address sub-ranges within the address range, wherein the indication includes a starting address and an ending address for each of the plurality of address sub-ranges; and
divide the cache into the plurality of address sub-ranges based on the starting address and the ending address for each of the plurality of address sub-ranges.

8. The apparatus of claim 1, wherein to configure the address range in the cache, the at least one processor, individually or in any combination, is configured to: configure the address range based on at least one of a physical address of a memory or a client identifier (ID).

9. The apparatus of claim 8, wherein the client ID corresponds to a graphics processing unit (GPU) or a central processing unit (CPU), and wherein the memory is a double data rate (DDR) memory.

10. The apparatus of claim 1, wherein the address range includes a range of ways and a range of sets in the cache, wherein the updated address associated with the updated address value for the set index corresponds to a portion of the range of ways and a portion of the range of sets.

11. The apparatus of claim 1, wherein to select the updated address value for the set index, the at least one processor, individually or in any combination, is configured to: overwrite the address value to the updated address value for the set index.

12. The apparatus of claim 1, wherein to select the updated address value for the set index, the at least one processor, individually or in any combination, is configured to: adjust a mapping of the address value to be an updated mapping that includes the updated address value for the set index.

13. The apparatus of claim 1, wherein the address range in the cache corresponds to a mapping for a plurality of set indices including the set index, and wherein to select the updated address value for the set index, the at least one processor, individually or in any combination, is configured to: select the updated address value for the set index within the address range corresponding to the mapping.

14. The apparatus of claim 1, wherein the at least one processor, individually or in any combination, is further configured to:
identify at least one of a way address or a tag address in the cache for the data in the request based on the selection of the updated address value for the set index, wherein the way address and the tag address in the cache correspond to the portion of the updated address in the cache.

15. The apparatus of claim 1, wherein the at least one processor, individually or in any combination, is further configured to:

determine that the data in the request is located in the cache, wherein the allocation of the data in the request to the updated address value for the set index is based on the determination that the data is located in the cache.

16. The apparatus of claim 1, wherein the at least one processor, individually or in any combination, is further configured to:
output an indication of the allocation of the data in the request to the updated address value for the set index.

17. The apparatus of claim 16, wherein to output the indication of the allocation of the data, the at least one processor, individually or in any combination, is configured to: transmit, to a graphics processing unit (GPU), a central processing unit (CPU), or a digital signal processor (DSP), the indication of the allocation of the data to the updated address value for the set index, wherein an amount of the plurality of set indexes is based on the transmission of the indication to the GPU, the CPU, or the DSP.

18. The apparatus of claim 16, wherein to output the indication of the allocation of the data, the at least one processor, individually or in any combination, is configured to: store, in a memory, the indication of the allocation of the data to the updated address value for the set index.

19. The apparatus of claim 1, wherein to configure the address range in the cache, the at least one processor, individually or in any combination, is configured to: obtain an indication of the address range in the cache, and wherein to select the updated address value for the set index, the at least one processor, individually or in any combination, is configured to: select the updated address value for the set index based on the indication of the address range.

20. The apparatus of claim 1, wherein to allocate the data in the request to the updated address value, the at least one processor, individually or in any combination, is configured to: write the data in the request to the updated address value for the set index.

21. The apparatus of claim 1, wherein to obtain the request to access the data, the at least one processor, individually or in any combination, is configured to: obtain the request to store or load the data in the cache, and wherein the selection of the updated address value for the set index is based on the request to store or load the data in the cache.

22. The apparatus of claim 1, wherein the updated address value for the set index is at least one updated set address in the cache, and wherein to select the updated address value for the set index, the at least one processor, individually or in any combination, is configured to: select the at least one updated set address in the cache.

23. The apparatus of claim 1, further comprising at least one of an antenna or a transceiver coupled to the at least one processor, where to obtain the request to access the data in the cache, the at least one processor, individually or in any combination, is configured to: obtain, via at least one of the antenna or the transceiver, the request to access the data in the cache, wherein the updated address within the address range in the cache corresponds to a number of sets in the cache, and wherein the number of sets in the cache is associated with at least one of a size of the cache or an associativity of the cache.

24. A method of data processing, comprising:
configuring an address range in a cache, wherein the address range is associated with data allocations for the cache;
obtaining a request to access data in the cache, wherein the request to access the data includes an address in the cache that maps to a set index in a plurality of set indexes, wherein an address value for the set index corresponds to a portion of the address in the cache;
selecting, based on the address value of the set index, an updated address value for the set index, wherein the updated address value is associated with an updated address within the address range in the cache, and wherein the updated address value corresponds to a portion of the updated address in the cache; and
allocating the data in the request to the updated address value for the set index.

25. The method of claim 24, wherein selecting the updated address value for the set index comprises: performing a physical address (PA)-based set partitioning process for the set index in order to obtain the updated address value for the set index, and wherein performing the PA-based set partitioning process for the set index comprises: parsing the address value for the set index in order to obtain the updated address value for the set index.

26. The method of claim 24, wherein selecting the updated address value for the set index comprises:
receiving an indication of the updated address value for the set index; and
selecting the updated address value for the set index based on the indication of the updated address value.

27. The method of claim 24, wherein allocating the data in the request to the updated address value comprises:
dividing the cache into a plurality of address sub-ranges within the address range in the cache; and
storing the data in the request to the updated address value in one of the plurality of address sub-ranges.

28. The method of claim 24, further comprising:
identifying at least one of a way address or a tag address in the cache for the data in the request based on the selection of the updated address value for the set index, wherein the way address and the tag address in the cache correspond to the portion of the updated address in the cache.

29. An apparatus for data processing, comprising:
means for configuring an address range in a cache, wherein the address range is associated with data allocations for the cache;
means for obtaining a request to access data in the cache, wherein the request to access the data includes an address in the cache that maps to a set index in a plurality of set indexes, wherein an address value for the set index corresponds to a portion of the address in the cache;
means for selecting, based on the address value of the set index, an updated address value for the set index, wherein the updated address value is associated with an updated address within the address range in the cache, and wherein the updated address value corresponds to a portion of the updated address in the cache; and
means for allocating the data in the request to the updated address value for the set index.

* * * * *